United States Patent
Kwon

(10) Patent No.: US 8,232,955 B2
(45) Date of Patent: Jul. 31, 2012

(54) AMBIENT LIGHT SENSOR CIRCUIT AND FLAT PANEL DISPLAY DEVICE HAVING THE SAME

(75) Inventor: Oh-Kyong Kwon, Seoul (KR)

(73) Assignee: IUCF-HYU;Industry-University Cooperation Foundation, Seoul (KR)

(*) Notice: Subject to any disclaimer, the term of this patent is extended or adjusted under 35 U.S.C. 154(b) by 1129 days.

(21) Appl. No.: 11/998,526

(22) Filed: Nov. 30, 2007

(65) Prior Publication Data
US 2008/0157682 A1 Jul. 3, 2008

(30) Foreign Application Priority Data

Dec. 27, 2006 (KR) .................. 10-2006-0135376
Aug. 10, 2007 (KR) .................. 10-2007-0080754

(51) Int. Cl.
*G09G 3/36* (2006.01)
(52) U.S. Cl. .................. 345/101; 345/98
(58) Field of Classification Search ......... 345/101–102, 345/207; 315/154
See application file for complete search history.

(56) References Cited

U.S. PATENT DOCUMENTS

| | | | |
|---|---|---|---|
| 6,396,217 B1 * | 5/2002 | Weindorf | 315/169.1 |
| 6,469,539 B2 | 10/2002 | Kim | |
| 6,967,682 B1 | 11/2005 | Hagihara | |
| 6,975,008 B2 | 12/2005 | Cok | |
| 7,595,795 B2 * | 9/2009 | Shin et al. | 345/207 |
| 7,936,346 B2 * | 5/2011 | Kunimori et al. | 345/207 |
| 2001/0020922 A1 | 9/2001 | Yamazaki et al. | |
| 2001/0035848 A1 | 11/2001 | Johnson et al. | |
| 2005/0087825 A1 | 4/2005 | Cok | |
| 2005/0218302 A1 | 10/2005 | Shin et al. | |
| 2005/0258341 A1 | 11/2005 | Nishikawa et al. | |

(Continued)

FOREIGN PATENT DOCUMENTS

JP 03264828 A 11/1991

(Continued)

OTHER PUBLICATIONS

The Hague; European Search Report; European Patent Application No. EP 07121621; Oct. 2, 2009.

(Continued)

*Primary Examiner* — Quan-Zhen Wang
*Assistant Examiner* — Calvin C Ma
(74) *Attorney, Agent, or Firm* — IpHorgan Ltd.

(57) ABSTRACT

An ambient light sensor circuit and a flat panel display device having same that can automatically control screen brightness by sensing ambient brightness and controlling an output current. The ambient light sensor circuit includes a transistor electrically coupled to a first power source; a first capacitive element electrically coupled between a control electrode of the transistor and a first reference power source; a second capacitive element electrically coupled between the first capacitive element and a second reference power source; a first light receiving element electrically coupled between the first and third reference power sources and controlling a coupling voltage of the first capacitive element and charge/discharge voltages of the second capacitive element by conducting current in response to ambient light; a first switch electrically coupled to the transistor and enabling the transistor to output current from the first power source according to the coupling voltage of the first capacitive element; and a second switch electrically coupled between the first light receiving element and the first capacitive element and interrupting a leakage current of the first light receiving element, thereby preventing the coupling voltage of the first capacitive element from being changed.

24 Claims, 11 Drawing Sheets

U.S. PATENT DOCUMENTS

| | | |
|---|---|---|
| 2005/0285017 A1 | 12/2005 | Tan et al. |
| 2006/0118697 A1 | 6/2006 | Lee et al. |
| 2006/0227082 A1 | 10/2006 | Ogata et al. |
| 2006/0244387 A1 | 11/2006 | Park et al. |
| 2006/0250330 A1 | 11/2006 | Fish |
| 2008/0158211 A1 | 7/2008 | Kwon |

FOREIGN PATENT DOCUMENTS

| | | |
|---|---|---|
| JP | 2001168311 A | 6/2001 |
| KR | 102000041445 A | 7/2000 |
| KR | 1020000067627 A | 11/2000 |
| KR | 1020050119559 A | 12/2005 |
| KR | 1020060063399 A | 6/2006 |
| KR | 1020060107345 A | 10/2006 |
| KR | 1020060107525 A | 10/2006 |
| KR | 1020060112997 A | 11/2006 |

OTHER PUBLICATIONS

Taiwan Advance Patent & Trademark Office; Taiwan Search Report; Taiwan Patent Application No. 096145816; May 25, 2011.

* cited by examiner

FIG. 13a
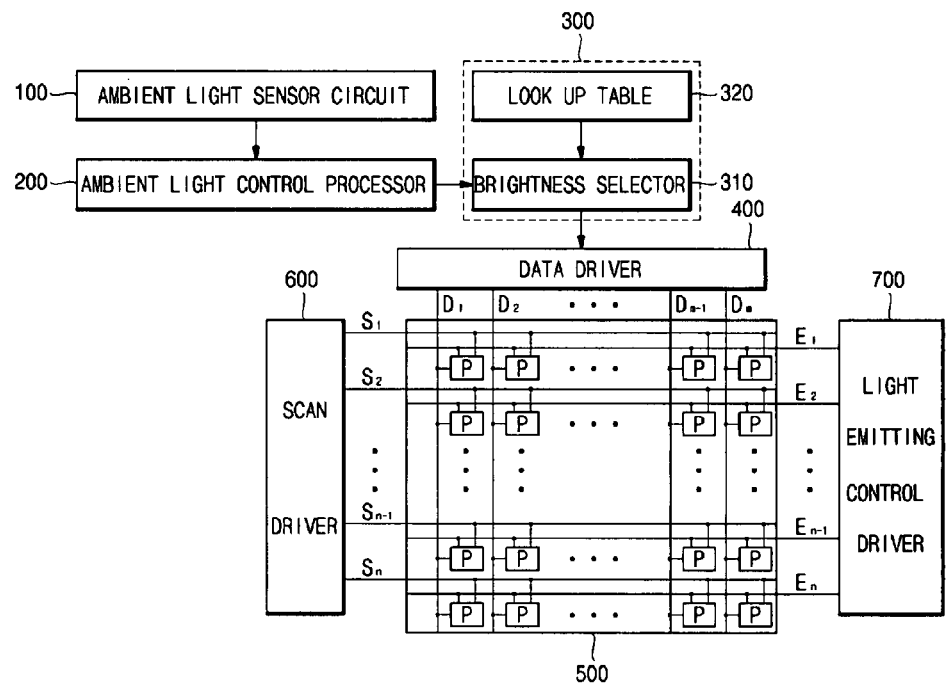
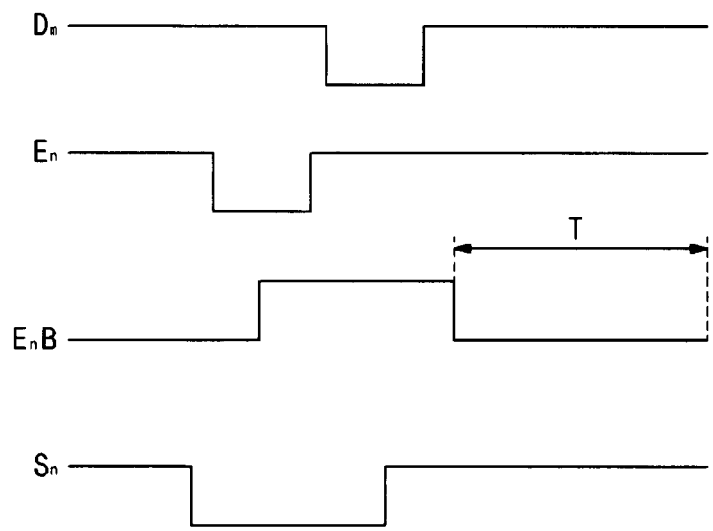
FIG. 13b

FIG. 14a
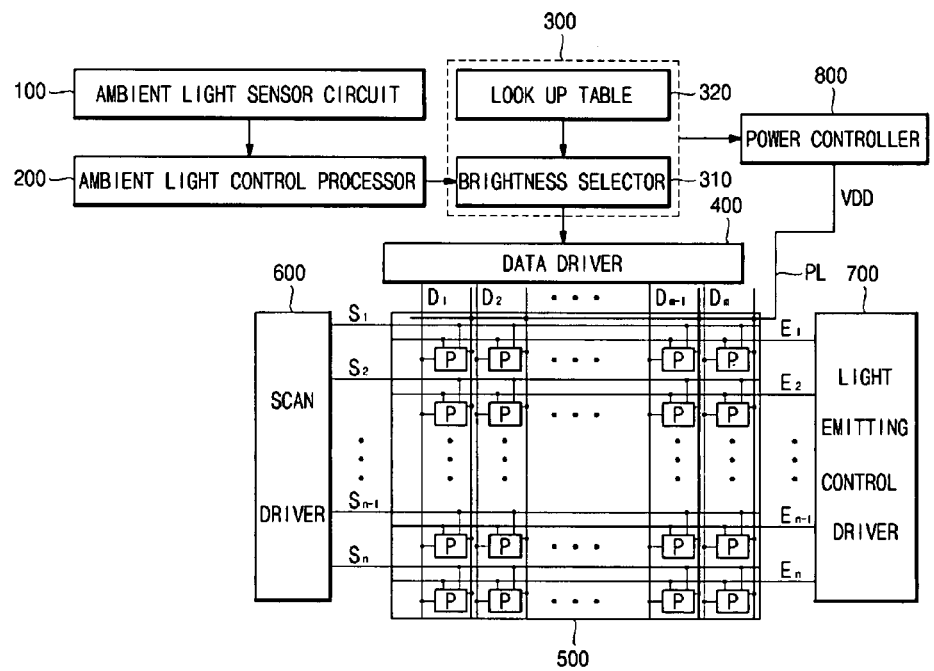
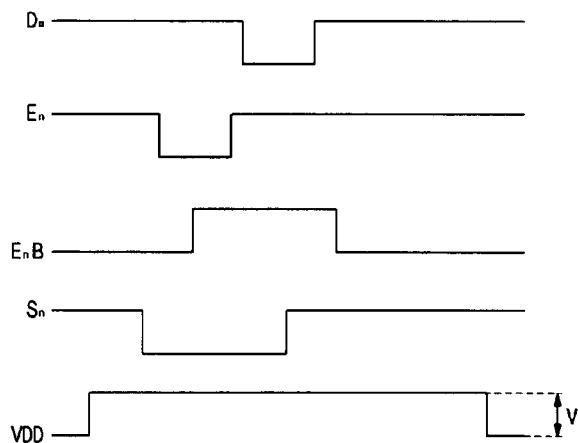
FIG. 14b

AMBIENT LIGHT SENSOR CIRCUIT AND FLAT PANEL DISPLAY DEVICE HAVING THE SAME

REFERENCE TO RELATED APPLICATIONS

This application is based on and claims priority to Korean Patent Application No. 10-2006-0135376, filed on Dec. 27, 2006, and 10-2007-0080754, filed on Aug. 10, 2007, in the Korean Intellectual Property Office (KIPO), the entire contents of which are hereby incorporated by reference.

BACKGROUND

1. Field of the Invention

The present invention relates to an ambient light sensor circuit and a flat panel display device having the same, and more particularly, to an ambient light sensor circuit and a flat panel display device having the same that can automatically control screen brightness by sensing ambient brightness and controlling an output current.

2. Description of the Related Art

Generally, a flat panel display device includes an organic electroluminescence display device, a liquid crystal display device, a plasma display device and a field emission display device. The flat panel display device has rapidly substituted for the conventional CRT (Cathode Ray Tube) display device because it is thin, lightweight and has low power consumption. The organic electroluminescence display device and the liquid crystal display device can be easily manufactured in a small size and can be used for a long time with a battery, and thus widely used as a display device for portable electronic devices.

The flat display device such as the organic electroluminescence display device or the liquid crystal display device can be artificially controlled of its brightness by operation of a user. However, it is designed so as to display a screen in constant brightness always regardless of the ambient brightness. For an example, the user feels the screen relatively more bright in the room where ambient brightness is not bright, but feels the screen relatively darker under the sun light, thus there is a problem of visibility.

In addition, brightness of the conventional flat panel display device is set to a constant level as described above, and thus there is a problem that power consumption is increased because its brightness is unnecessarily high when it is used for a long time in a relatively dark place.

In addition, when an ambient light sensor circuit is manufactured for sensing ambient brightness in the conventional flat panel display device, a sensor, a substrate and circuits should be formed on a separate substrate different from a main substrate where the flat display panel is formed, and connected to the main board, and thus size, thickness and power consumption of the flat panel display device are increased.

In addition, an output current of the ambient light sensor circuit of the conventional flat panel display device is changed due to a light leakage current during a sampling period, and thus the ambient light sensor circuit cannot exactly sample the ambient light.

Further, the output current of the ambient light sensor circuit of the conventional flat panel display device is changed due to a temperature leakage current according to increase of an ambient temperature, and thus the ambient light sensor circuit cannot exactly sense the ambient light.

SUMMARY OF THE INVENTION

Accordingly, an object of the present invention is to provide an ambient light sensor circuit and a flat panel display device having the same that can improve visibility in both bright place and dark place by automatically controlling screen brightness of the flat panel display device according to ambient brightness by sensing the ambient brightness and controlling an output current.

Another object of the present invention is to provide an ambient light sensor circuit and a flat panel display device having the same that can extend a lifetime of a portable flat panel display device by keeping optimum power consumption by automatically controlling the power consumption according to ambient brightness Still another object of the present invention is to provide an ambient light sensor circuit and a flat panel display device having the same that can prevent size and thickness of the flat panel display device from being unnecessarily increased by forming an ambient light sensor circuit, an ambient light processor, a timing controller, a data driver, a scan driver and a light emitting control driver on the same substrate as which an organic electroluminescence panel (or liquid crystal panel) is formed on.

Further still another object of the present invention is to provide an ambient light sensor circuit and a flat panel display device having the same that can exactly sample an ambient light by interrupting a light leakage current applied from a light receiving element in a sampling period for the ambient light and preventing an output current from being changed by the light leakage current.

Further still another object of the present invention is to provide an ambient light sensor circuit and a flat panel display device having the same that can prevent an output current of the ambient light sensor circuit from being changed by a temperature leakage current according to increase of an ambient temperature.

Additional advantages, objects and features of the invention will be set forth in part in the description which follows and in part will become apparent to those having ordinary skill in the art upon examination of the following or may be learned from practice of the invention.

According to an aspect of the present invention, there is provided an ambient light sensor circuit which includes: a transistor electrically coupled to a first power source; a first capacitive element electrically coupled between a control electrode of the transistor and a first reference power source; a second capacitive element electrically coupled between the first capacitive element and a second reference power source; a first light receiving element electrically coupled between the first and third reference power sources and controlling a coupling voltage of the first capacitive element and charge/discharge voltages of the second capacitive element by conducting current in response to ambient light; a first switch electrically coupled to the transistor and enabling the transistor to output current from the first power source according to the coupling voltage of the first capacitive element; and a second switch electrically coupled between the first light receiving element and the first capacitive element and interrupting a leakage current of the first light receiving element, thereby preventing the coupling voltage of the first capacitive element from being changed.

A third switch electrically coupled between the first reference power source and the second switch so as to apply a first reference voltage from the first power source to the first and second capacitive elements via the second switch.

A fourth switch electrically coupled between a control electrode of the transistor and the first switch and enabling the transistor to form a diode-connected structure.

A fifth switch electrically coupled between the first switch and the reference power source so as to apply a reference current to the transistor via the first switch, thereby applying a predetermined voltage to the control electrode of the transistor.

A sixth switch electrically coupled to the first switch and enabling the transistor to transmit a predetermined current to an output terminal via the first switch from the first power source in response to the coupling voltage of the first and second capacitive elements.

A third capacitive element electrically coupled to the second capacitive element and increasing a reverse bias capacity of the first light receiving element.

A seventh switch electrically coupled between the second and third capacitive elements so as to electrically couple them each other.

A third switch electrically coupled between the first reference power source and the second switch so as to apply a first reference voltage from the first power source to the first and second capacitive elements via the second switch; a fourth switch electrically coupled between a control electrode of the transistor and the first switch and enabling the transistor to form a diode-connected structure; a fifth switch electrically coupled between the first switch and the reference power source so as to apply a reference current to the transistor via the first switch, thereby applying a predetermined voltage to the control electrode of the transistor; a sixth switch electrically coupled to the first switch and enabling the transistor to transmit a predetermined current to an output terminal via the first switch from the first power source in response to the coupling voltage of the first and second capacitive elements; a third capacitive element electrically coupled to the second capacitive element and increasing a reverse bias capacity of the first light receiving element; and a seventh switch electrically coupled between the second and third capacitive elements so as to electrically couple them each other.

The first light receiving element is any one selected from a p-intrinsic-n (p-i-n) diode, a p-intrinsic-metal (p-i-m) diode, a p-n diode and a photocoupler, whose anode is electrically coupled, to the first reference power source and the cathode is electrically coupled to the third reference power source.

The third reference voltage applied from the third reference power source is higher than the first reference voltage applied from the first reference power source.

The first light receiving element, is any one selected from a p-intrinsic-n (p-i-n) diode, a p-intrinsic-metal (p-i-m) diode, a p-n diode and a photocoupler, whose cathode is electrically coupled to the first reference power source and the anode is electrically coupled to the third reference power source.

The third reference voltage applied from the third reference power source is lower than the first reference voltage applied from the first reference power source.

A second light receiving element electrically coupled between the first light receiving element and a fourth reference power source and including a light shielding layer, and accordingly sensing only a leakage current depending on an increase of temperature because ambient light is shielded.

A temperature sensor sensing a temperature; a look up table electrically coupled to the temperature sensor and storing an ambient light sensing time corresponding to the sensed temperature; and a controller electrically coupled to the look up table and supplying a first control signal to the first switch in response to the ambient light sensing time outputted from the look up table.

A first switching transistor whose first and second electrodes are electrically coupled between the first and second capacitive elements and the control electrode is electrically coupled to a second negative control signal; and a second switching transistor whose first and second electrodes are electrically coupled to the transistor and the control electrode is electrically coupled to a third negative control signal.

The fourth and seventh switches are formed of two serially connected transistors.

According to an aspect of the present invention, there is provided a flat panel display device which includes: an ambient light sensor circuit which includes: a transistor electrically coupled to a first power source; a first capacitive element electrically coupled between the transistor and a first reference power source; a second capacitive element electrically coupled between the first power source, the first capacitive element and a second reference power source; a first light receiving element electrically coupled between the first and third reference power sources and controlling a coupling voltage of the first capacitive element and charge/discharge voltages of the second capacitive element by conducting current in response to ambient light; a first switch electrically coupled to the transistor and enabling the transistor to output current from the first power source according to the coupling voltage of the first capacitive element; and a second switch electrically coupled, between the first light receiving element and the first capacitive element and interrupting a leakage current of the first light receiving element, thereby preventing the coupling voltage of the first capacitive element from being changed; an ambient light control processor receiving an analog output signal from the ambient light sensor circuit as an input signal and calculating a present ambient light and outputting it as a digital value; a timing controller receiving the output signal from the ambient light control processor as an input signal and outputting a control signal corresponding the present ambient light; and an organic electroluminescence panel receiving the control signal corresponding to the present ambient light applied from the timing controller and light-emitting with a brightness corresponding to the present ambient light.

The timing controller comprises: a look up table storing data corresponding to the present ambient brightness; and a brightness selector comparing a data inputted from the ambient light control processor with a data stored in the look up table and selecting a data control signal corresponding to the present ambient brightness and outputting it to the data driver.

A data driver receiving the output signal from the timing controller as an input signal and outputting a data signal corresponding to the present ambient brightness and applying it to the organic electroluminescence panel.

A light emitting control driver receiving the output signal from the timing controller as an input signal and outputting a light emitting control signal and applying it to the organic electroluminescence panel.

A power controller receiving the output signal from the timing controller as an input signal and outputting a power voltage corresponding to the present ambient light and applying it to the organic electroluminescence panel.

According to an aspect of the present invention, there is provided a flat panel display device which includes: an ambient light sensor circuit which includes: an ambient light sensor circuit which includes: a transistor electrically coupled to a first power source; a first capacitive element electrically coupled between the transistor and a first reference power source; a second capacitive element electrically coupled between the first power source, the first capacitive element and a second reference power source; a first light receiving element electrically coupled between the first and third reference power sources and controlling a coupling voltage of the first capacitive element and charge/discharge voltages of the second capacitive element by conducting current in response to ambient light; a first switch electrically coupled to the transistor and enabling the transistor to output current from the first power source according to the coupling voltage of the first capacitive element; and a second switch electrically coupled between the first light receiving element and the first capacitive element and interrupting a leakage current of the first light receiving element, thereby preventing the coupling voltage of the first capacitive element from being changed; an ambient light control processor receiving an analog output signal from the ambient light sensor circuit as an input signal and calculating a present ambient light and outputting it as a digital value; a timing controller receiving the output signal from the ambient light control processor as an input signal and outputting a control signal corresponding to the present ambient light; an inverter receiving the output signal from the timing controller as an input signal and boosting the power voltage to a level corresponding to the present ambient light and outputting it; a backlight turned on/off by a voltage supplied from the inverter; and a liquid crystal display panel displaying a screen by the backlight.

BRIEF DESCRIPTION OF THE DRAWING FIGURES

The above and other objects, features and advantages of the present invention will be more apparent from the following detailed description taken in conjunction with the accompanying drawing, in which:

FIG. 13a is a block diagram illustrating a construction of a flat panel display device having an ambient light sensor circuit according to a further still another exemplary embodiment of the present invention and FIG. 13b is a timing diagram of the device;

FIG. 14a is a block diagram illustrating a construction of a flat panel display device having an ambient light sensor circuit according to a further still another exemplary embodiment of the present invention and FIG. 14b is a timing diagram of the device;

DETAILED DESCRIPTION OF PREFERRED EMBODIMENTS

Figure 1A:
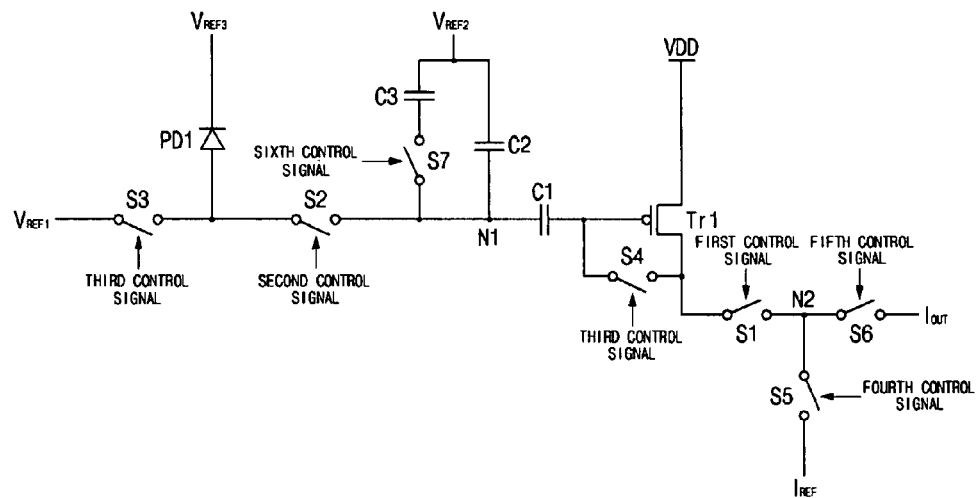
FIGS. 1a to 1c are circuit diagrams illustrating an ambient light sensor circuit for a flat panel display device according to one exemplary embodiment of the present invention.

Hereinafter, preferred embodiments of the present invention will be described in detail with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present invention is only defined within the scope of the appended claims. In the entire description of the present invention, the same drawing reference numerals are used for the same elements across various figures. Further, a term of "electrically coupled" means not only "directly coupled" but also "coupled via other interposing element".

Figure 1B:
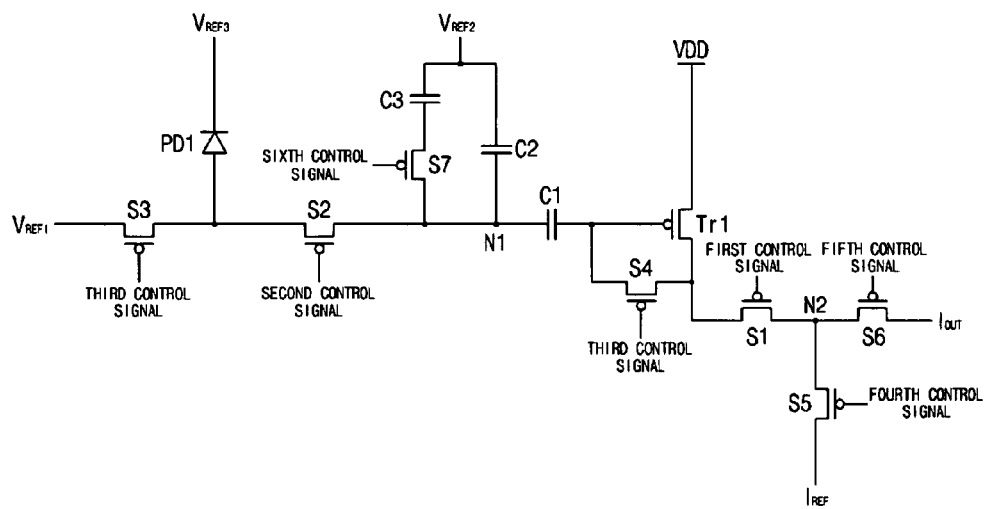
Figure 1C:
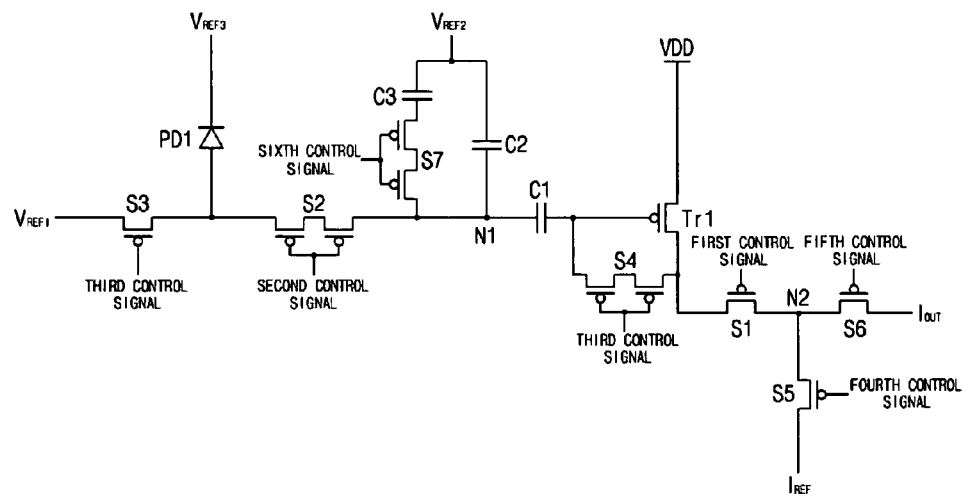

FIGS. 1a to 1c show circuit diagrams illustrating an ambient light sensor circuit for a flat panel display device according to one exemplary embodiment of the present invention.

Referring to FIG. 1a, the ambient light sensor circuit for the flat panel display device includes a transistor Tr1, a first capacitive element C1, a second capacitive element C2, a third capacitive element C3, a first light receiving element PD1, a first switch S1, a second switch S2, a third switch S3, a fourth switch S4, a fifth switch S5, a sixth switch S6 and a seventh switch S7. Here, a second reference power source $V_{REF2}$ and a third reference power source $V_{REF3}$ may be electrically coupled to a VDD and receive a first voltage, and thus be operated the same as the ambient light sensor circuit for the flat panel display device of FIG. 1. The same drawing reference numerals are used for each reference power source and reference voltage for convenience of explanation below. In other words, the same reference numeral, a first reference power source $V_{REF1}$ is used for a first power source and a first reference voltage, and second reference power source $V_{REF2}$ is used for a second power source and a second reference voltage, and third reference power source $V_{REF3}$ is used for a third power source and a third reference voltage.

The transistor Tr1 includes a first electrode (source or drain), a second electrode (drain or source) and a control electrode (gate electrode). The first electrode of the transistor Tr1 is electrically coupled to the VDD and the second electrode is electrically coupled between a first electrode of the first switch S1 and a second electrode of the fourth switch S4, and the control electrode is electrically coupled between a first electrode of the fourth switch S4 and a second electrode of the first capacitive element C1. The transistor Tr1 is a P channel transistor and may be any one selected from an amorphous silicon transistor, a polycrystalline silicon thin film transistor, an organic thin film transistor, a nano thin film transistor and its equivalents, but not limited thereto.

In addition, when the transistor Tr1 is a polycrystalline silicon thin film transistor, it may be formed by any one method selected from a laser crystallization method, a metal-induced crystallization method, a high pressure crystallization method and its equivalents, but not limited thereto.

The laser crystallization method is a method of crystallizing by irradiating, for example, an excimer laser to amorphous silicon, and the metal-induced crystallization method is a method of starting crystallization from metal by providing, for example, the metal on amorphous silicon and heating it at a predetermined temperature, and the high pressure crystallization method is a method of crystallizing by applying, for example, a predetermined pressure to amorphous silicon.

A first electrode of the first capacitive element C1 is electrically coupled to a first node N1 between a second electrode of the second capacitive element C2 and a second electrode of the second switch S2 and a second electrode of the seventh switch S7. A second electrode of the first capacitive element C1 is electrically coupled between the control electrode and a first electrode of the fourth switch S4. The first capacitive element C1 stores a voltage corresponding to a voltage difference between the first and second electrodes of the first capacitive element C1, and generates a coupling voltage with the second capacitive element C2 and applies it to the control electrode of the transistor Tr1.

A first electrode of the second capacitive element C2 is electrically coupled to a second reference power source $V_{REF2}$, and a second electrode of the second capacitive element C2 is electrically coupled to a first node N1 between a first electrode of the first capacitive element C1 and the second electrode of the second switch S2 and the second electrode of the seventh switch S7. The second capacitive element C2 stores a voltage corresponding to a voltage difference between the first and second electrodes of the second capacitive element C2, and generates a coupling voltage with the first capacitive element C1 and applies it to the control electrode of the transistor Tr1. In addition, the second capacitive element C2 improves a signal holding property by increasing a reverse bias capacity of a first light receiving element PD1.

A first electrode of the third capacitive element C3 is electrically coupled to the second reference power source $V_{REF2}$, and a second electrode of the third capacitive element C3 is electrically coupled to the first electrode of the seventh switch S7. The third capacitive element C3 stores a voltage corresponding to a voltage difference between the first and second electrodes of the third capacitive element C3, and improves a signal holding property by increasing a reverse bias capacity of a first light receiving element PD1.

An anode of the first light receiving element PD1 is electrically coupled between the first electrode of the second switch S2 and the second electrode of the third switch S3, and a cathode of the first light receiving element PD1 is electrically coupled to a third reference power source $V_{REF3}$. Here, when the first electrode of the third switch S3 is electrically coupled to the first reference power source $V_{REF1}$ and turned on, it applies the first reference power source $V_{REF1}$ to the cathode of the first light receiving element PD1 and the first reference power source $V_{REF1}$ may be a level lower than the third reference power source $V_{REF3}$. In addition, the first light receiving element PD1 may be any one selected from a p-intrinsic-n (p-i-n) diode, a p-intrinsic-metal (p-i-m) diode, a p-n diode, a photocoupler and its equivalents, but not limited thereto. The first light receiving element PD1 charges the first capacitive element C1 and second capacitive element C2 by applying current from the third reference power source $V_{REF3}$ in response to ambient light.

A first electrode of the first switch S1 is electrically coupled between the second electrode of the transistor Tr1 and the second electrode of the fourth switch S4, and a second electrode of the first switch S1 is electrically coupled to a second node N2 that is a contact point between the fifth switch S5 and sixth switch S6. The first switch S1 can be turned on/off by a first control signal applied to the control electrode. The first switch S1 may be formed of any one selected from an N channel or a P channel low temperature polycrystalline silicon and its equivalents, but not limited thereto. The first switch S1 initializes the first capacitive element C1 to a predetermined voltage, or outputs to an output terminal $I_{OUT}$ a predetermined amount of current applied via the transistor Tr1 from the VDD in response to the coupling voltage of the first capacitive element C1 and second capacitive element C2.

A first electrode of the second switch S2 is electrically coupled between the anode of the first light receiving element PD1 and the second electrode of the third switch S3, and a second electrode of the second switch S2 is electrically coupled between the first electrode of the first capacitive element C1 and the second electrode of the second capacitive element C2. The second switch S2 can be turned on/off by a second control signal applied to the control electrode. The second switch S2 may be formed of any one selected from an N channel or a P channel low temperature polycrystalline silicon and its equivalents, but not limited thereto. When the second switch S2 is turned off, a light leakage current of the first light receiving element PD1 applied to the first and second capacitive elements C1 and C2 is interrupted, thereby preventing the coupling voltage of the first capacitive element C1 and second capacitive element C2 from being changed.

A first electrode of the third switch S3 is electrically coupled to the first reference power source $V_{REF1}$ and a second electrode of the third switch S3 is electrically coupled between the anode of the first light receiving element PD1 and the first electrode of the second switch S2. The third switch S3 can be turned on/off by a third control signal applied to the control electrode. The third switch S3 may be formed of any one selected from an N channel or a P channel low temperature polycrystalline silicon and its equivalents, but not limited thereto. When the third switch S3 is turned on, the first reference power source $V_{REF1}$ applied to the first electrode is transmitted to the first capacitive element C1 and second capacitive element C2.

A first electrode of the fourth switch S4 is electrically coupled between the control electrode of the transistor Tr1 and the second electrode of the first capacitive element C1, and a second electrode of the fourth switch S4 is electrically coupled between the second electrode of the transistor Tr1 and the first electrode of the first switch S1. The fourth switch S4 can be turned on/off by the third control signal applied to the control electrode. The fourth switch S4 may be formed of any one selected from an N channel or a P channel low temperature polycrystalline silicon and its equivalents, but not limited thereto. When the fourth switch S4 is turned on, the transistor Tr1 forms a diode-connected structure.

A first electrode of the fifth switch S5 is electrically coupled to the second node N2 between the second electrode of the first switch S1 and the first electrode of the sixth switch S6, and a second electrode of the fifth switch S5 is electrically coupled to a reference current source $I_{REF}$. The fifth switch S5 can be turned on/off by a fourth control signal applied to the control electrode. The fifth switch S5 may be formed of any one selected from an N channel or a P channel low temperature polycrystalline silicon and its equivalents, but not limited thereto. When the fifth switch S5 is turned on, the reference current applied from the reference current source $I_{REF}$ is applied to the transistor Tr1 via the first switch S1. In this time, the transistor Tr1 forms a diode-connected structure. When the first reference power source $V_{REF1}$ is applied to the first node N1, the coupling voltage of the first capacitive element C1 and second capacitive element C2 is kept constantly.

A first electrode of the sixth switch S6 is electrically coupled to the first node N1 between the second electrode of the first switch S1 and the first electrode of the fifth switch S5, and a second electrode of the sixth switch S6 is electrically coupled to the output terminal $I_{OUT}$. The sixth switch S6 can be turned on/off by a fifth control signal applied to the control electrode. The sixth switch S6 may be formed of any one selected from an N channel or a P channel low temperature polycrystalline silicon and its equivalents, but not limited thereto. When the fourth switch S4 is turned on, the transistor Tr1 forms a diode-connected structure. The sixth switch S6 outputs to an output terminal $I_{OUT}$ a predetermined amount of current applied via the transistor Tr1 from the VDD in response to the coupling voltage of the first capacitive element C1 and second capacitive element C2.

A first electrode of the seventh switch S7 is electrically coupled to the second electrode of the third capacitive element C3, and a second electrode of the second switch S2 is electrically coupled between the second electrode of the second switch S2 and the first electrode of the first capacitive element C1 and the second electrode of the second capacitive element C2. The seventh switch S7 can be turned on/off by a sixth control signal applied to the control electrode. The seventh switch S7 may be formed of any one selected from an N channel or a P channel low temperature polycrystalline silicon and its equivalents, but not limited thereto. When a large amount of light is suddenly incident and the seventh switch S7 is turned on, the third capacitive element C3 and second capacitive element C2 are connected in parallel with each other so as to increase reverse bias capacity of the first light receiving element PD1, thereby improving signal holding property.

Referring to FIG. 1b, the ambient light sensor circuit for the flat panel display device is the same as the ambient light sensor circuit of FIG. 1a except that the switches S1 to S7 are formed of a P channel transistor.

Referring to FIG. 1c, the ambient light sensor circuit for the flat panel display device is the same as the ambient light sensor circuit of FIG. 1b except that the switches S2 to S4 and seventh switch S7 are formed of two P channel transistors. When the second switch S2, fourth switch S4 and seventh switch S7 are turned off, voltages of the first node N1 and the gate electrode of the transistor Tr1 is affected by leakage current flowing through each switch. Therefore, the leakage current of the switch can be reduced by forming the switch of two serially connected transistors, thereby compensating a phenomenon that voltages of the first node N1 and the gate electrode of the transistor Tr1 are changed by the leakage current.

Figure 2A:
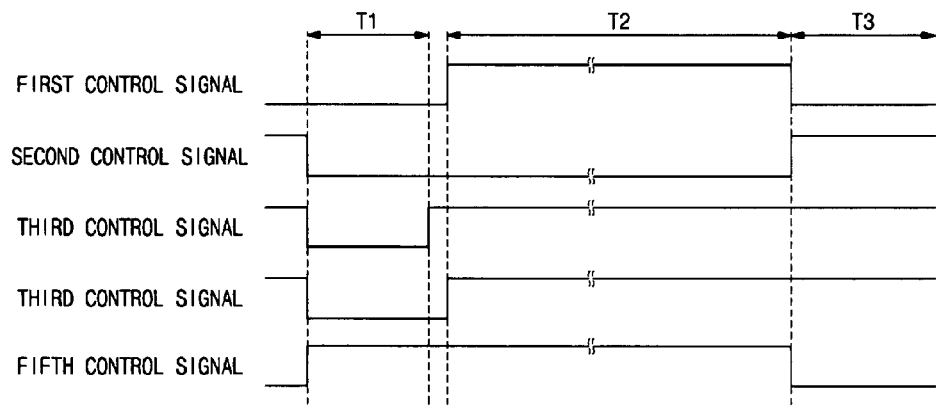
FIG. 2 is a timing diagram of the ambient light sensor circuit for the flat panel display device.
Figure 2B:
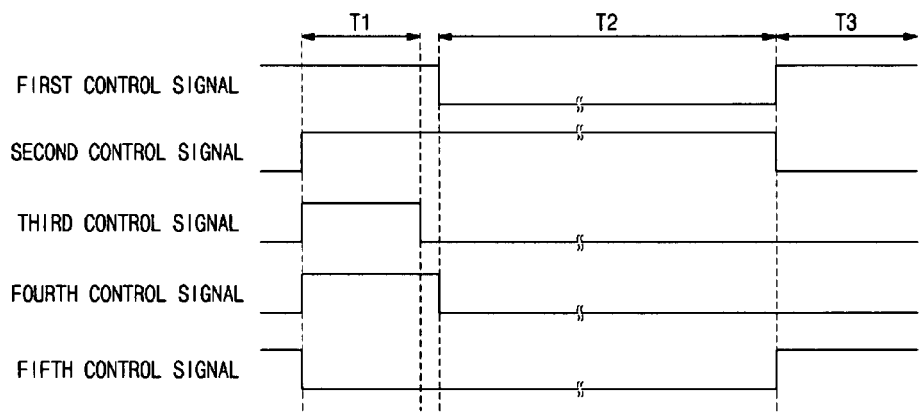

FIGS. 2a and 2b show timing diagrams of the ambient light sensor circuit for the flat panel display device of FIGS. 1a to 1c. FIG. 2a shows a timing diagram of the case where the switches S1 to S7 are P channel transistors and FIG. 2b shows a timing diagram of the case where the switches S1 to S7 are N channel transistors. The timing diagrams of FIGS. 2a and 2b are the same as each other except that it is turned on at a low level when the switches S1 to S7 are P channel transistors, and it is turned on at a high level when the switches S1 to S7 are N channel transistors. Therefore, the timing diagram of FIG. 2a will be mainly explained below.

Referring to FIGS. 2a and 2b, the timing diagram of the ambient light sensor circuit for the flat panel display device includes an initialization period T1, an ambient light sensing period T2 and a sampling period T3. Five control signals, that is, the first control signal, the second control signal, the third control signal, the fourth control signal and the fifth control signal are applied to the ambient light sensor circuit for the flat panel display device.

In addition, when the ambient light is relatively very bright and thus a large amount of light is incident, the sixth control signal is applied to the ambient light sensor circuit. A timing diagram for the sixth control signal is omitted, but the operation of the seventh switch S7 by the sixth control signal will be explained in detail below.

First, in the initialization period T1, when the first to fourth control signals of low level are applied to the ambient light sensor circuit for the flat panel display device, the first switch S1, second switch S2, third switch S3, fourth switch S4 and fifth switch S5 are turned on, and when the fifth control signal of high level is applied, the sixth switch S6 is turned off.

When the fifth switch S5 is turned on, the reference current of the reference current source $I_{REF}$ is transmitted to the first switch S1, and when the first switch S1 is turned on, the reference current is transmitted to the second electrode of the transistor Tr1. In this time, when the fourth switch S4 is turned on, the transistor Tr1 forms a diode-connected structure. Because the transistor Tr1 forms the diode-connected structure and the reference current is applied to the second electrode constantly, the voltage applied to the control electrode of the transistor Tr1 is kept at a constant voltage $V_A$.

When the third switch S3 is turned on, a first reference voltage applied from the first reference power source $V_{REF1}$ is transmitted to the second switch S2 and first light receiving element PD1, and when the second switch S2 is turned on, the reference voltage is transmitted to the first node N1. The reference voltage applied to the first node N1 is transmitted to the first capacitive element C1 and second capacitive element C2.

The first capacitive element C1 stores a voltage corresponding to a difference between the first reference power source $V_{REF1}$ applied to the first electrode of the first capacitive element C1 and the voltage $V_A$ of the control electrode of the transistor Tr1 applied to the second electrode. The second capacitive element C2 stores a voltage corresponding to a difference between the second reference power source $V_{REF2}$ applied to the first electrode of the second capacitive element C2 and the first reference power source $V_{REF1}$ applied to the second electrode. In other words, when the first reference power source $V_{REF1}$, second reference power source $V_{REF2}$ and reference current $I_{REF}$ of a constant value are applied, the voltages stored in the first capacitive element C1 and second capacitive element C2 are initialized to a constant value.

Next, in the ambient light sensing period T2, when the second control signal of low level is applied, the second switch S2 is turned on. When the first, third, fourth and fifth control signals of high level are applied, the first switch S1, third switch S3, fourth switch S4, fifth switch S5 and sixth switch S6 are turned off.

When the second switch S2 is turned on, a reverse current formed between the first electrode and second electrode of the first light receiving element PD1 is applied to the first node N1 that is a contact point of the first capacitive element C1 and second capacitive element C2. Here, the reverse current formed through the first light receiving element PD1 is different depending on brightness of the ambient light. In other words, when the ambient light becomes dark, the current flowing through the first light receiving element PD1 becomes low, and when the ambient light becomes bright, the current flowing through the first light receiving element PD1 becomes high.

When the reverse current formed through the first light receiving element PD1 is applied to the first node N1 that is the contact point of the first capacitive element C1 and second capacitive element C2, the voltage of the first node N1 is changed from the first reference power source $V_{REF1}$ by a voltage $\Delta V$ corresponding to the reverse current and thus becomes $V_{REF1}+\Delta V$. In this time, the first reference power source $V_{REF1}$ is the voltage applied to the first node N1 in the initialization period T1.

According to a change of the voltage of the first node N1, the voltage of the second electrode of the first capacitive element C1 and a storage voltage of the second capacitive element C2 are changed in corresponding to the changed voltage of the first node N1. In other words, the voltage of the first node N1 is changed by $\Delta V$ in corresponding to the reverse current formed through the first light receiving element PD1, and the voltage stored in the second capacitive element C2 is changed by $\Delta V$ in corresponding to the changed voltage $\Delta V$ of the first node N1 and charged, and the voltage stored in the first capacitive element C1 is kept without change. Thus, the voltage of the second electrode of the first capacitive element C1 is changed by $\Delta V$. Therefore, the coupling voltage of the first capacitive element C1 is changed in corresponding to the changed voltage of the first node N1.

Here, the second capacitive element C2 is quickly charged when the ambient light is relatively bright, but slowly charged when the ambient light is relatively dark.

Finally, in the sampling period T3, when the first and fifth control signals of low level are applied, the first switch S1 and sixth switch S6 are turned on. When the second, third and fourth control signals of high level are applied the second switch S2, third switch S3, fourth switch S4 and fifth switch S5 are turned off.

When the first switch S1 is turned on, the current applied from the transistor Tr1 is outputted to the output terminal $I_{OUT}$ via the sixth switch S6. In this time, the transistor Tr1 outputs a current $I_{REF}-\Delta I$ corresponding to the coupling voltage of the first capacitive element C1 and second capacitive element C2 to the output terminal $I_{OUT}$ via the sixth switch S6. In other words, the coupling voltage of the first capacitive element C1 and second capacitive element C2 is applied to the control electrode. When the coupling voltage is low, a relatively large current is outputted to the output terminal $I_{OUT}$ via the transistor Tr1. When the coupling voltage is high, a relatively small current is outputted to the output terminal $I_{OUT}$ via the transistor Tr1.

Here, $\Delta I$ is a current change amount that the current flowing through the transistor Tr1 is changed when the voltage change amount $\Delta V$ corresponding to the reverse current formed through the first light receiving element PD1 is applied to the first node N1. The coupling voltage of the first capacitive element C1 and second capacitive element C2 becomes the voltage of the control electrode of the transistor Tr1. Accordingly, the $\Delta I$ becomes small when the coupling voltage is low, and the $\Delta I$ becomes large when the coupling voltage is high.

As described above, when a relatively weak light is incident to the first light receiving element PD1, the current flowing through the first light receiving element PD1 becomes relatively small, and accordingly the coupling voltage by the first capacitive element C1 and second capacitive element C2 becomes relatively low. Then, naturally the current $I_{REF}-\Delta I$ flowing through transistor Tr1 becomes relatively large. On the other hand, when a relatively strong light is incident to the first light receiving element PD1, the current flowing through the first light receiving element PD1 becomes relatively large, and accordingly the coupling voltage by the first capacitive element C1 and second capacitive element C2 becomes relatively high. Then, naturally the current $I_{REF}-\Delta I$ flowing through transistor Tr1 becomes relatively small.

When the second switch S2 is turned off, the first light receiving element PD1 is separated from the first node N1. The light leakage current generated by reaction of the first light receiving element PD1 with the ambient light in the sampling period T3 is applied to the first node N1, thereby preventing change of the coupling voltage of the first capacitive element C1 and second capacitive element C2.

On the other hand, operation of the third capacitive element C3 by the sixth control signal will be explained below. When bright light is suddenly incident to the first light receiving element PD1, the second capacitive element C2 is quickly charged. In this time, the first node N1, that is, the second electrode of the second capacitive element C2 is charged to the third reference power source $V_{REF3}$. In other words, when ambient light brighter than a predetermined brightness is sensed, constant output currents are outputted from the transistor Tr1. Accordingly, it is impossible to exactly sense the ambient light.

To prevent the phenomenon as described above, the circuit is turned on by applying the sixth control signal in a low level by taking as a feedback signal that the output current of the output terminal $I_{OUT}$ is continuously kept below a threshold value for a predetermined time. Then, the third capacitive element C3 is connected in parallel with the second capacitive element C2.

Therefore, the second capacitive element C2 and third capacitive element C3 are connected in parallel with each other and thus the capacitance of the capacitor is increased. Accordingly, reverse bias capacity of the first light receiving element PD1 is more increased. Of course, the second capacitive element C2 and third capacitive element C3 affect the coupling voltage with the first capacitive element C1, and, as a result, the coupling voltage affects operation of the transistor Tr1. Accordingly, the transistor Tr1 is operated in a reliable operation period, and thus a stable output voltage is obtained. That is, the third capacitive element C3 is connected in parallel with the second capacitive element C2, and thus the first light receiving element PD1 can more smoothly sense the ambient light.

Figure 3:
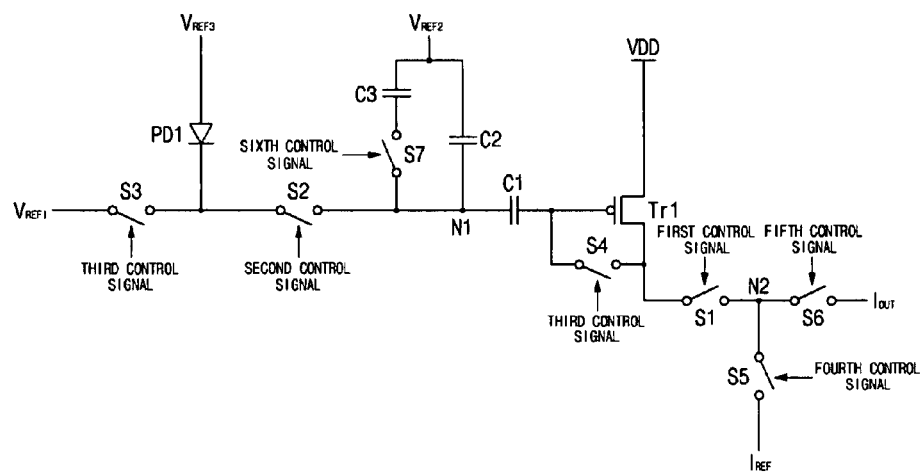
FIG. 3 is a circuit diagram illustrating an ambient light sensor circuit for a flat panel display device according to another exemplary embodiment of the present invention.

FIG. 3 shows a circuit diagram illustrating an ambient light sensor circuit for a flat panel display device according to another exemplary embodiment of the present invention.

Referring to FIG. 3, the ambient light sensor circuit for the flat panel display device is similar to the ambient light sensor circuit shown in FIG. 1a except that the cathode and anode of the first light receiving element PD1 are oppositely connected, in other words, the cathode is electrically coupled between the first electrode of the second switch S2 and the second electrode of the third switch S3, and the anode is electrically coupled to the third reference power source $V_{REF3}$. In this time, the first electrode of the third switch S3 is electrically coupled to the first reference power source $V_{REF1}$ and, when it is turned on, the first reference power source $V_{REF1}$ is applied to the cathode of the first light receiving element PD1. Here, the first reference power source $V_{REF1}$ may be higher than the third reference power source $V_{REF3}$. Accordingly, in the ambient light sensor circuit of FIG. 1a, the second capacitive element C2 is charged and the coupling voltage by the first capacitive element C1 is increased according to increase of the reverse current flowing through the first light receiving element PD1. However, in the ambient light sensor circuit of FIG. 3, the second capacitive element C2 is discharged and the coupling voltage by the first capacitive element C1 is decreased according to increase of the reverse current flowing through the first light receiving element PD1.

Figure 4:
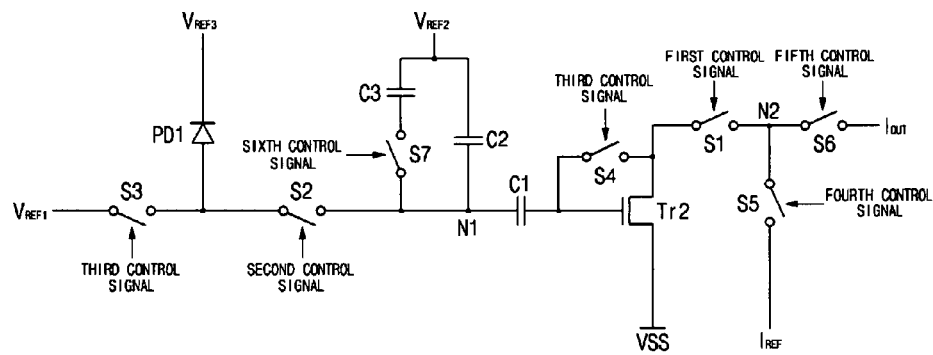
FIG. 4 is a circuit diagram illustrating an ambient light sensor circuit for a flat panel display device according to a still another exemplary embodiment of the present invention.

FIG. 4 shows a circuit diagram illustrating an ambient light sensor circuit for a flat panel display device according to a still another exemplary embodiment of the present invention.

Referring to FIG. 4, the ambient light sensor circuit for the flat panel display device is similar to the ambient light sensor circuit shown in FIG. 1a except that a transistor Tr2 is formed of an N channel transistor. In the ambient light sensor circuit of FIG. 1a, the first switch S1, fourth switch S4, fifth switch S5 and sixth switch S6 are electrically coupled to the second electrode of the transistor Tr1. In the ambient light sensor circuit of FIG. 4, the transistor Tr2 is an N channel transistor, and thus the first switch S1, fourth switch S4, fifth switch S5 and sixth switch S6 are electrically coupled to the first electrode. The ambient light sensor circuit for the flat panel display device shown in FIG. 4 is similar to the ambient light sensor circuit of FIG. 1a except that the N channel transistor is used instead of the P channel transistor, and thus the ambient light sensor circuit is operated the same as described in FIGS. 1a, 2a and 2b.

Figure 5:
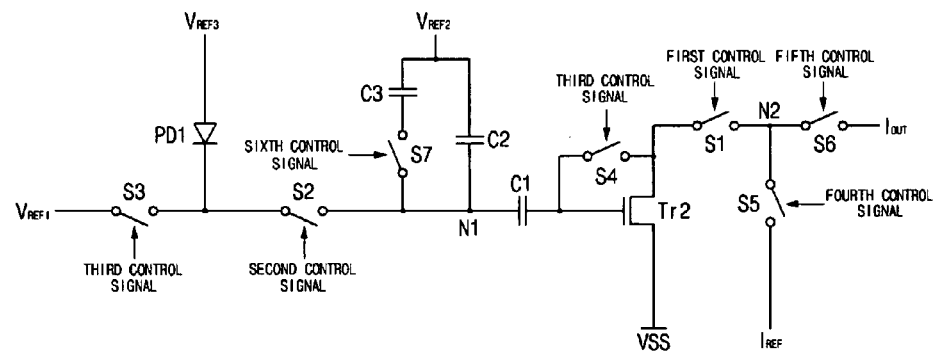
FIG. 5 is a circuit diagram illustrating an ambient light sensor circuit for a flat panel display device according to a further still another exemplary embodiment of the present invention.

FIG. 5 shows a circuit diagram illustrating an ambient light sensor circuit for a flat panel display device according to a further still another exemplary embodiment of the present invention.

Referring to FIG. 5, the ambient light sensor circuit for the flat panel display device is similar to the ambient light sensor circuit shown in FIG. 4 except that the cathode and anode of the first light receiving element PD1 are oppositely connected, in other words, the cathode is electrically coupled between the first electrode of the second switch S2 and the second electrode of the third switch S3, and the anode is electrically coupled to the third reference power source $V_{REF3}$. In this time, the first electrode of the third switch S3 is electrically coupled to the first reference power source $V_{REF1}$ and, when it is turned on, the first reference power source $V_{REF1}$ is applied to the cathode of the first light receiving element PD1. Here, the first reference power source $V_{REF1}$ may be higher than the third reference power source $V_{REF3}$. Accordingly, in the ambient light sensor circuit of FIG. 4, the second capacitive element C2 is charged and the coupling voltage by the first capacitive element C1 is increased according to increase of the reverse current flowing through the first light receiving element PD1. However, in the ambient light sensor circuit of FIG. 5, the second capacitive element C2 is discharged and the coupling voltage by the first capacitive element C1 is decreased according to increase of the reverse current flowing through the first light receiving element PD1.

Figure 6:
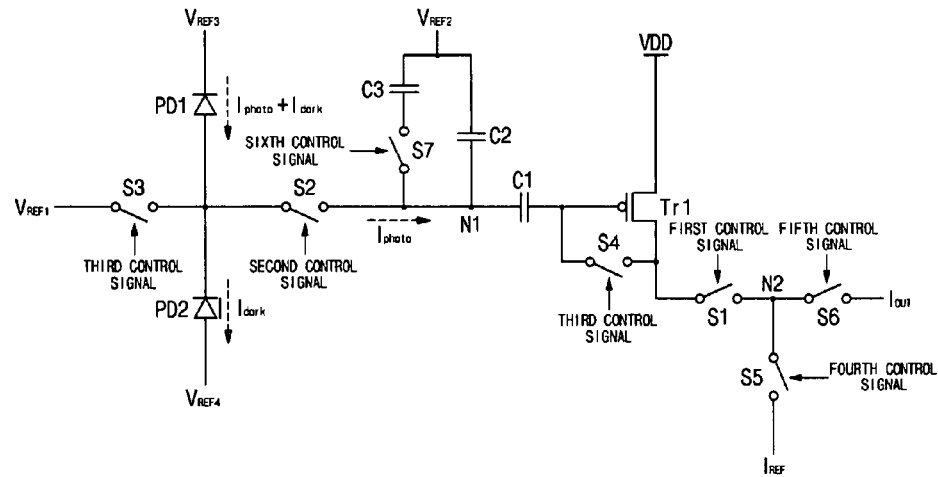
FIG. 6 is a circuit diagram illustrating an ambient light sensor circuit for a flat panel display device according to a further still another exemplary embodiment of the present invention.

FIG. 6 shows a circuit diagram illustrating an ambient light sensor circuit for a flat panel display device according to a further still another exemplary embodiment of the present invention.

Referring to FIG. 6, the ambient light sensor circuit for the flat panel display device is similar to the ambient light sensor circuit shown in FIG. 1a except that the ambient light sensor circuit further includes a second light receiving element PD2 electrically coupled to the cathode of the first light receiving element PD1 and including a light shielding plate. A cathode of the second light receiving element PD2 is electrically coupled to the anode of the first light receiving element PD1, and an anode of the second light receiving element PD2 is electrically coupled to the vref4. Here, the first reference power source $V_{REF1}$ may be low level than the third reference power source $V_{REF3}$, and the vref4 may be low level than the first reference power source $V_{REF1}$.

When ambient light is incident to the first light receiving element PD1, the first light receiving element PD1 conducts current from the third reference power source $V_{REF3}$ in response to the ambient light so as to change the coupling voltage of the first capacitive element C1 and to charge the second capacitive element C2. In this time, the current flowing through the first light receiving element PD1 is increased according to increase of temperature. In other words, a leakage current is generated. The second light receiving element PD2 includes the light shielding plate, and thus current flowing through the second light receiving element PD2 is changed according to the increase of temperature similarly to the first light receiving element PD1. However, there is no current change caused by the incident ambient light. Therefore, a difference between the current flowing through the first light receiving element PD1 and the current flowing through the second light receiving element PD2 is a current caused by the ambient light, and thus a voltage corresponding to the current difference can be applied to the first node N1. Thus, it is possible to prevent the output current from being changed by the leakage current caused by temperature. The first light receiving element PD1 and second light receiving element PD2 are light receiving elements having the same property and also have the same temperature property.

In other words, the current flowing through the first light receiving element PD1 is a current $I_{dark}$ according to a current $I_{photo}$ from the third reference power source $V_{REF3}$ and the increase of temperature in response to the ambient light. The current flowing through the second light receiving element PD2 includes only, the current $I_{dark}$ caused by the increase of temperature because the second light receiving element PD2 includes the light shielding plate. Therefore, the difference between the current flowing through the first light receiving element PD1 and the current flowing through the second light receiving element PD2 becomes the current $I_{photo}$ from the third reference power source $V_{REF3}$. Accordingly, only the current $I_{photo}$ caused by the ambient light without being affected by the change of temperature flows through the ambient light sensor circuit via the second switch S2, and thus the leakage current caused by temperature is removed, thereby preventing change of the output current.

The ambient light sensor circuits of FIGS. 3 to 5 can prevent change of the output current by removing the leakage current caused by temperature by further including a second light receiving element PD2 with a light shielding plate.

Figure 7:
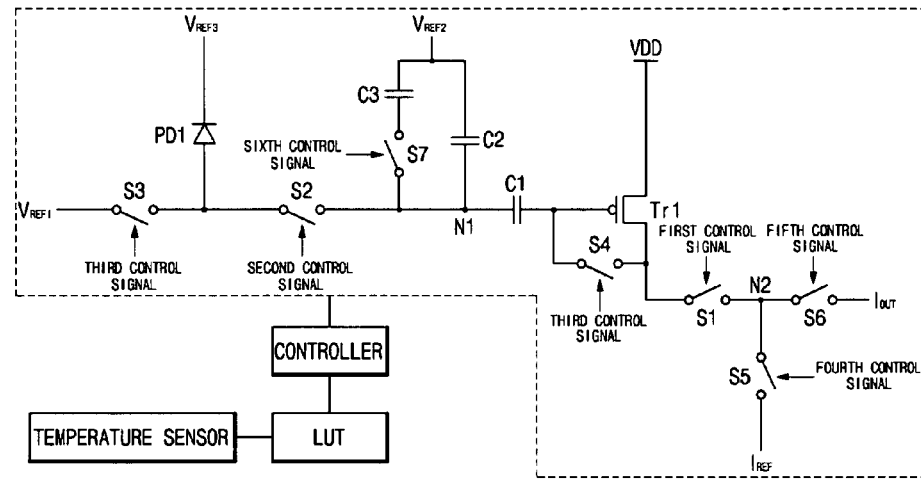
FIG. 7 is a circuit diagram illustrating an ambient light sensor circuit for a flat panel display device according to a further still another exemplary embodiment of the present invention.

FIG. 7 shows a circuit diagram illustrating an ambient light sensor circuit for a flat panel display device according to a further still another exemplary embodiment of the present invention.

Referring to FIG. 7, the ambient light sensor circuit for the flat panel display device is similar to the ambient light sensor circuit shown in FIG. 1a except that the ambient light sensor circuit further includes a temperature sensor, a look up table (LUT) and a controller.

The temperature sensor is electrically coupled to the look up table (LUT) and senses a temperature of the ambient light sensor circuit, and transmits the sensed temperature to the look up table (LUT).

The look up table (LUT) is electrically coupled between the temperature sensor and the controller so as to transmit an ambient light sensing time corresponding to the sensed temperature to the controller. Here, the look up table (LUT) is a memory storing an ambient light sensing time corresponding to the sensed temperature, and FIG. 8 shows a characteristic curve of the look up table.

The controller is electrically coupled between the first to sixth control signals and the look up table (LUT). The look up table (LUT) outputs the ambient light sensing time corresponding to the sensed temperature and transmits it to the controller, and applies the ambient light sensing time depending on temperature to the first to sixth control signals. In this time, when the temperature is increased, the leakage current is increased and thus the ambient light sensing time is reduced. When the temperature is decreased, the leakage current is not generated and thus the ambient light sensing time is increased in comparison with the case where the temperature is high. Thus, the current outputted through the transistor Tr1 from the output terminal $I_{OUT}$ is kept constantly.

The ambient light sensor circuits of FIGS. 3 to 5 can prevent change of the output current by controlling the ambient light sensing time in response to a leakage current caused by temperature by further including a temperature sensor, a look up table (LUT) and a controller.

Figure 8:
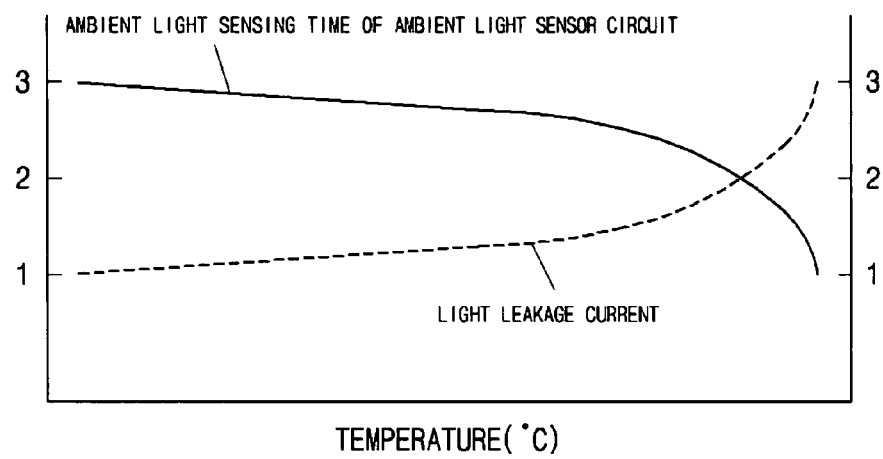
FIG. 8 is a characteristic curve illustrating a look up table of the ambient light sensor circuit for the flat panel display device of FIG. 7.

FIG. 8 is a characteristic curve illustrating the look up table of the ambient light sensor circuit for the flat panel display device of FIG. 7.

Referring to the characteristic curve of FIG. 8, the leakage current of the light receiving element is increased according to increase of the sensed temperature applied from the temperature sensor. The ambient light sensing time is increased according to increase of the leakage current. When the sensed temperature applied from the temperature sensor is increased, the leakage current of the light receiving element is increased and thus the ambient light sensing time is decreased. A time for applying a voltage to the first node N1 between the first capacitive element C1 and second capacitive element C2 from the first light receiving element PD1 is reduced and thus charging time of the first capacitive element C1 and second capacitive element C2 is reduced. In other words, the change of the output current outputted from the output terminal $I_{OUT}$ can be prevented by reducing the ambient light sensing time so as to compensate the increase of current caused by temperature.

Figure 9:
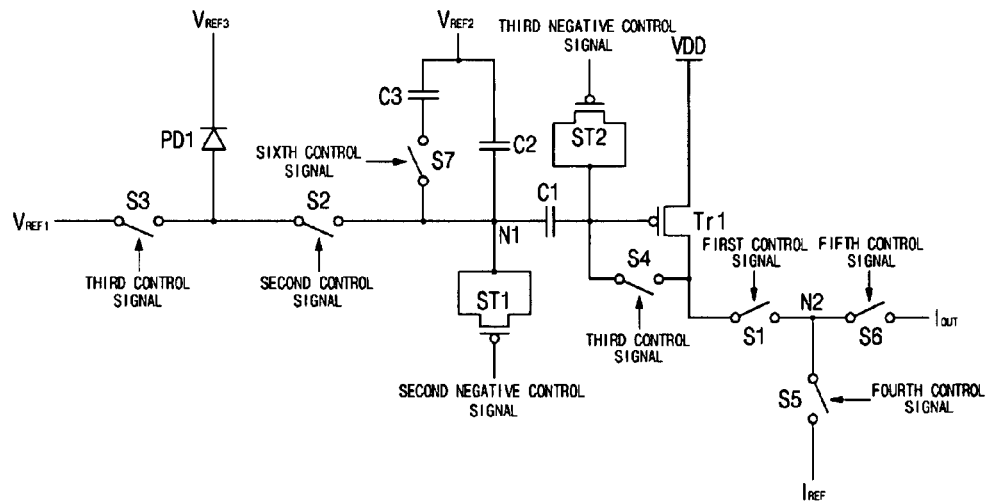
FIG. 9 is a circuit diagram illustrating an ambient light sensor circuit for a flat panel display device according to a further still another exemplary embodiment of the present invention.

FIG. 9 shows a circuit diagram illustrating an ambient light sensor circuit for a flat panel display device according to a further still another exemplary embodiment of the present invention.

Referring to FIG. 9, the ambient light sensor circuit for the flat panel display device is similar to the ambient light sensor circuit shown in FIG. 1a except that the ambient light sensor circuit further includes a first switching transistor ST1 and a second switching transistor ST2.

The first switching transistor ST1 includes a first electrode (source or drain), a second electrode (drain or source) and a control electrode (gate electrode). The first electrode and second electrode of the first switching transistor ST1 are electrically coupled to the first node N1 between the first capacitive element C1 and second capacitive element C2. The first switching transistor ST1 can be turned on/off by a second negative control signal applied to the control electrode. Here, the second negative control signal is a signal opposite to the second control signal. When the second control signal is high level, the second negative control signal is low level, and when the second control signal is low level, the second negative control signal is high level.

As shown in FIG. 9, a P channel transistor may be used as the first switching transistor ST1. In this time, a P channel transistor is also used as the second switch S2. When the first switching transistor ST1 is turned on, the second switch S2 is turned off, and when the first switching transistor ST1 is turned off, the second switch S2 is turned on. In other words, the first switching transistor ST1 and second switch S2 are operated in opposite to each other. The first switching transistor ST1 may be an N channel transistor. In this time, the second switch S2 should be also the N channel transistor.

When the period is changed to the sampling period T3 from the ambient light sensing period T2 in which the first switching transistor ST1 is turned on and the second switch S2 is turned off, there is generated a phenomenon that the output current is reduced according to increase of the voltage of the control electrode of the transistor Tr1 because of switching error at the time when the second switch S2 is turned off. The first switching transistor ST1 can compensate the phenomenon.

The second switching transistor ST2 includes a first electrode (source or drain), a second electrode (drain or source) and a control electrode (gate electrode). The first electrode and second electrode of the second switching transistor ST2 are electrically coupled to the control electrode of the transistor Tr1. The second switching transistor ST2 can be turned on/off by a third negative control signal applied to the control electrode. Here, the third negative control signal is a signal opposite to the third control signal. When the third control signal is high level, the third negative control signal is low level, and when the third control signal is low level, the third negative control signal is high level.

As shown in FIG. 9, a P channel transistor may be used as the second switching transistor ST2. In this time, a P channel transistor is also used as the fourth switch S4. When the second switching transistor ST2 is turned on, the fourth switch S4 is turned off, and when the second switching transistor ST2 is turned off, the fourth switch S4 is turned on. In other words, the second switching transistor ST2 and fourth switch S4 are operated in opposite to each other. The second switching transistor ST2 may be an N channel transistor. In this time, the fourth switch S4 should be also the N channel transistor.

When the period is changed to the ambient light sensing period T2 from the initialization period T1 in which the second switching transistor ST2 is turned on and the fourth switch S4 is turned off, there is generated a phenomenon that the output current is reduced according to increase of the voltage of the control electrode of the transistor Tr1 because of switching error at the time when the fourth switch S4 is turned off. A dummy switch, that is, the first switching transistor ST1 is turned on, thereby compensating the phenomenon.

The ambient light sensor circuits of FIGS. 3 to 5 can compensate the phenomenon that the output current is reduced according to increase of the voltage of the control electrode of the transistor because of switching error by further including a first switching transistor ST1 and a second switching transistor ST2.

Figure 10:
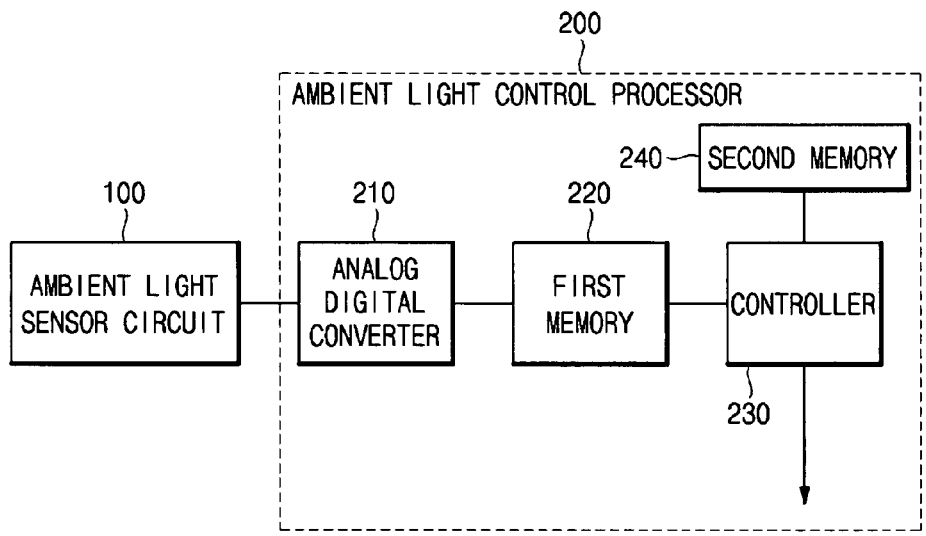
FIG. 10 is a block diagram illustrating a state that an ambient light control processor is further connected to the ambient light sensor circuit.

FIG. 10 shows a block diagram illustrating a state that an ambient light control processor is further connected to the ambient light sensor circuit.

As shown in FIG. 10, the present invention may further include the ambient light control processor 200 for processing signals from the ambient light sensor circuit 100. The ambient light sensor circuit 100 may be any one selected from the ambient light sensor circuits shown in FIGS. 1a to 1c, FIGS. 3 to 7 and FIG. 9. In addition, the ambient light control processor 200 includes an analog-digital converter 210, a first memory 220, a controller 230 and a second memory 240.

The analog-digital converter 210 is electrically coupled through the fifth switch S5. Of course, an output load 120 and a load capacitive element CL are included in the analog-digital converter 210. Substantially, the output load may be an internal load of the analog-digital converter, and the load capacitive element CL may be a capacitive component formed in a wire. The analog-digital converter 210 converts the analog output current value into a digital value and outputs it.

The first memory 220 is electrically coupled to the analog-digital converter 210 and temporarily stores a digital value according to a state of ambient light sensed at present.

The controller 230 is electrically coupled to the memory 220 so as to calculate brightness of the presently sensed ambient light and output it.

The second memory 240 is electrically coupled to the controller 230 so as to previously store digital values obtained from the ambient light of various brightness.

As described above, the present brightness of ambient light is calculated by comparing a data of the sensed ambient light inputted from the first memory 220 with data of ambient light of various brightness stored in the second memory 240.

Substantially, the ambient light sensor circuit 100 is formed on the same substrate as the panel of the flat panel display device. On the other hand, the ambient light control processor 200 may be separately formed in one chip type, but not limited thereto. The ambient light control processor 200 may be formed on the same substrate as the display panel.

Figure 11:
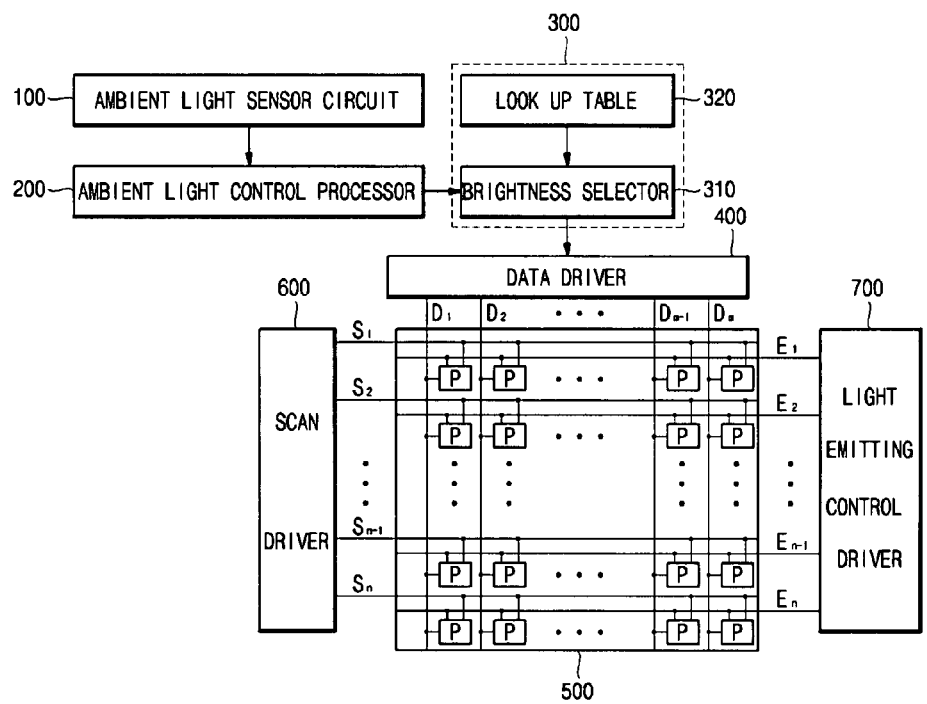
FIG. 11 is a block diagram illustrating a construction of a flat panel display device having an ambient light sensor circuit according to a further still another exemplary embodiment of the present invention.

FIG. 11 shows a block diagram illustrating a construction of a flat panel display device having an ambient light sensor circuit according to a further still another exemplary embodiment of the present invention.

Here, the ambient light sensor circuit 100 and an ambient light control processor 200 are illustrated in block diagrams for convenience of explanation. The ambient light sensor circuit 100 may be any one selected from the ambient light sensor circuits shown in FIGS. 1a to 1c, FIGS. 3 to 7 and FIG. 9.

Referring to FIG. 11, the flat panel display device may further include a timing controller 300, a data driver 400, an organic electroluminescence panel 500, a scan driver 600 and a light emitting control driver 700 in addition to the ambient light sensor circuit 100 and ambient light control processor 200. The construction and operation of the ambient light sensor circuit 100 and ambient light control processor 200 have been explained in detail in the above description and thus the detailed explanation will be omitted below. In addition, in the organic electroluminescence panel 500, a circuit unit and an organic emitting layer forms one pixel together. The pixels are arranged in matrix type so as to display still or moving pictures. In other words, a plurality of data lines D1 to Dm extended from the data driver 400, a plurality of scan lines S1 to Sn extended from the scan driver 600 and a plurality of light emitting control lines E1 to En extended from the light emitting control driver 700 are formed in the organic electroluminescence panel 500. In addition, a predetermined pixel is formed in a region where the data line, scan line and light emitting control line are intersected to each other.

The timing controller 300 includes a brightness selector 310 and a look up table 320. In the timing controller 300, the brightness selector 310 compares a digital value inputted from the ambient light control processor 200 with a value stored in the previously formed look up table, and outputs a data control signal corresponding to the value, to the data driver 400. Of course, optimal brightness data control signals matched to the digital values inputted from the ambient light control processor 200 for each of R, G and B are previously stored in the look up table 320.

Then, the data driver 400 outputs a proper data signal to the organic electroluminescence device according to the ambient light. For example, when the sensed ambient light is relatively bright, the data driver outputs a data voltage |V| for outputting a relatively large amount of light, thereby displaying a screen of high brightness through the organic electroluminescence panel 500. On the other hand, when the sensed ambient light is relatively dark, the data driver outputs a data voltage |V| for outputting a relatively small amount of light, thereby displaying a screen of low brightness through the organic electroluminescence panel 500.

As described above, according to the present invention, there is provided the display device that can automatically control brightness of screen depending on the ambient light. The scan driver 600 outputs a scan signal to the organic electroluminescence panel 500 so as to select a pixel to be turned on or off. The light emitting control driver 700 outputs a light emitting time signal corresponding to a turn-on time of each pixel to the organic electroluminescence panel 500. The scan driver 600 and light emitting control driver 700 are well known to those of ordinary skill in the art, and therefore detailed explanation will be omitted.

On the other hand, the ambient light sensor circuit 100, ambient light control processor 200, timing controller 300, data driver 400, organic electroluminescence panel 500, scan driver 600 and light emitting control driver 700 may be formed on one common substrate through a semiconductor process and a thin film process. Of course, at least anyone of the ambient light sensor circuit 100, ambient light control processor 200, timing controller 300, data driver 400, organic electroluminescence panel 500, scan driver 600 and light emitting control driver 700 may be formed on a substrate different from the substrate where the organic electroluminescence panel 500 is formed, but not limited thereto.

Figure 12A:
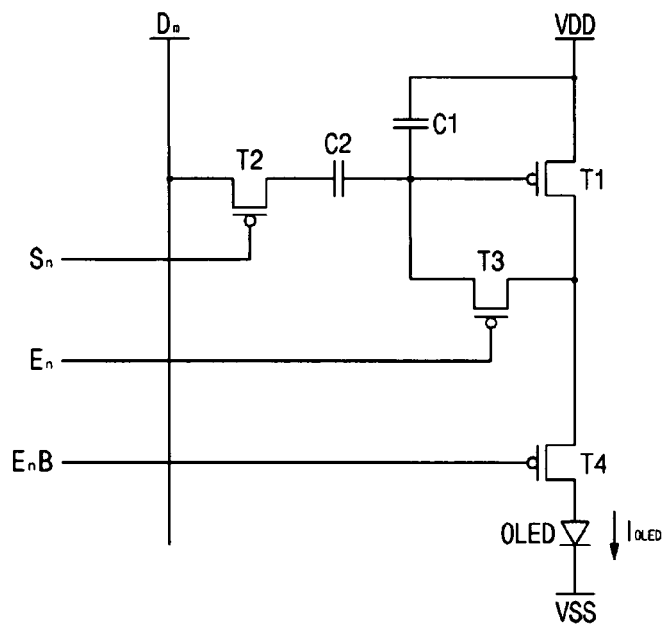
FIG. 12a is a circuit diagram illustrating one example of a pixel circuit of an organic electroluminescence panel of a flat panel display device.
Figure 12B:
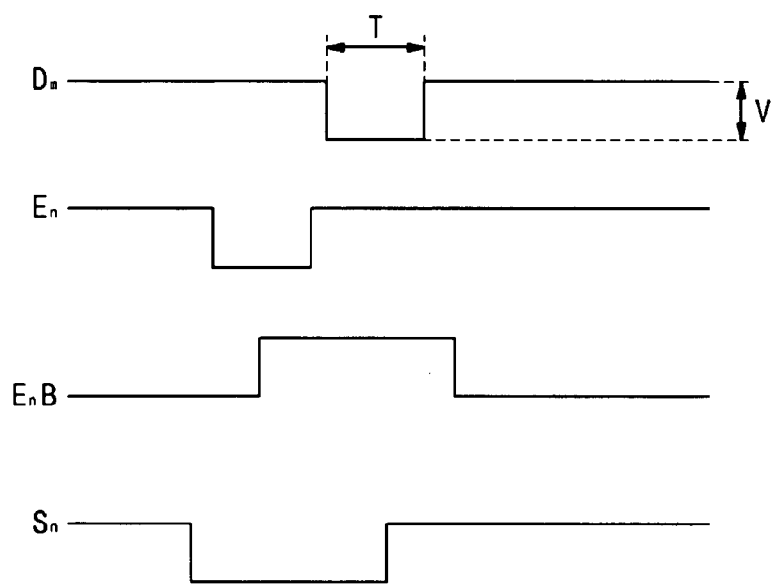
FIG. 12b is a timing diagram of the pixel circuit.

FIG. 12a shows a circuit diagram illustrating one example of a pixel circuit of an organic electroluminescence panel of a flat panel display device, and FIG. 12b shows a timing diagram of the pixel circuit. The ambient light sensor circuit 100 may be any one selected from the ambient light sensor circuits shown in FIGS. 1a to 1c, FIGS. 3 to 7 and FIG. 9.

Referring to FIG. 12a, the pixel circuit includes a scan line Sn supplying a scan signal, a data line Dm supplying a data voltage, a first power line VDD supplying a first voltage, a second power line VSS supplying a second voltage, an auto zero line An supplying an auto zero signal, a light emitting control line En supplying a light emitting control signal, first to fourth transistors T1 to T4, first capacitive element C1 and second capacitive element C2, and an organic light emitting diode (OLED). Here, the voltage of the first power line VDD is relatively higher than the voltage of the second power line VSS.

Referring to FIG. 12b, in the pixel circuit, when a control signal of low level is supplied to a control electrode of the third transistor T3 from the auto zero line An, the third transistor T3 is turned on. Next, when a control signal of high level is supplied to a control electrode of the fourth transistor T4 from the light emitting control line En, the fourth transistor T4 is turned off. Then, the T1 forms a diode-connected structure and a threshold voltage of the T1 is stored in the first capacitive element C1. On the other hand, when the auto zero signal becomes high level and a predetermined level of data voltage corresponding to ambient light is applied from the data line Dm, a data voltage having a threshold voltage compensated by ratio of the first capacitive element C1 and second capacitive element C2 is supplied to a control electrode of the first transistor T1 (data writing operation). Next, when the light emitting control signal becomes low level, the fourth transistor T4 is turned on and a predetermined current flows through the organic light emitting diode (OLED), thereby emitting lights.

According to the pixel circuit as described above, the current flowing through the organic light emitting diode flows in correspondence to only the data voltage supplied from the data line regardless of the threshold voltage of the first transistor. That is, according to the pixel circuit, a difference of the threshold voltage of the first transistor is compensated, thereby providing an organic electroluminescence display device of high grayscale.

According to the present invention, brightness of a screen is automatically controlled according to ambient brightness. In other words, the data voltage from the data line Dm of the pixel circuit is controlled, and accordingly the coupling voltage by the first capacitive element C1 and second capacitive element C2 is controlled, and thus the current flowing to the organic light emitting diode (OLED) through the first transistor T1 is changed. Therefore, the current through the organic light emitting diode (OLED) is changed, thereby controlling brightness of the organic electroluminescence panel.

FIG. 13a shows a block diagram illustrating a construction of a flat panel display device having an ambient light sensor circuit according to a further still another exemplary embodiment of the present invention and FIG. 13b shows a timing diagram of the device. The ambient light sensor circuit 100 may be any one selected from the ambient light sensor circuits shown in FIGS. 1a to 1c, FIGS. 3 to 7 and FIG. 9.

Referring to FIG. 13a, the flat panel display device having the ambient light sensor circuit is different from that of FIG. 11 in that a brightness control signal outputted from a timing controller 300 is not inputted to a data driver 400 and inputted to a light emitting control driver 700.

Then the light emitting control driver 700 outputs a light emitting control signal corresponding to the ambient light to the organic electroluminescence panel 500. For an example, when the sensed ambient light is relatively bright, the light emitting control driver 700 outputs a light emitting control signal of relatively long time, thereby displaying a screen of high brightness through the organic electroluminescence panel 500. On the other hand, when the sensed ambient light is relatively dark, the light emitting control driver 700 outputs a light emitting control signal of relatively short time, thereby displaying a screen of low brightness through the organic electroluminescence panel 500.

As described above, according to the present invention, there is provided the display device that can automatically control brightness of screen depending on the ambient light.

More particularly, as shown in FIG. 13b, the light emitting time of the organic light emitting diode (OLED) is controlled by controlling a length of time T of the light emitting control signal En. For example, when ambient brightness is dark, a relatively short light emitting control time T is supplied so as to relatively shorten the light emitting time of the organic light emitting diode (OLED), thereby displaying a dark screen. On the other hand, when ambient brightness is bright, a relatively long light emitting control time T is supplied so as to relatively lengthen the light emitting time of the organic light emitting diode (OLED), thereby displaying a bright screen.

FIG. 14a shows a block diagram illustrating a construction of a flat panel display device having an ambient light sensor circuit according to a further still another exemplary embodiment of the present invention and FIG. 14b shows a timing diagram of the device. The ambient light sensor circuit 100 may be any one selected from the ambient light sensor circuits shown in FIGS. 1a to 1c, FIGS. 3 to 7 and FIG. 9.

Referring to FIG. 14a, the flat panel display device having the ambient light sensor circuit is different from that of FIG. 13a in that a brightness control signal outputted from a timing controller 300 is not inputted to a data driver 700 and inputted to a power controller 800.

Then, the power controller 800 outputs a power voltage corresponding to the ambient light to the organic electroluminescence panel 500. For example, when the sensed ambient light is relatively bright, the power controller 800 supplies a relatively high power voltage so as to relatively decrease the brightness of the organic light emitting diode (OLED), thereby displaying a screen of high brightness through the organic electroluminescence panel 500. On the other hand, when the sensed ambient light is relatively dark, the power controller 800 supplies a relatively low power voltage, thereby displaying a screen of low brightness through the organic electroluminescence panel 500. The unexplained reference numeral PL in the drawing indicates a power line formed in the organic electroluminescence panel.

As described above, according to the present invention, there is provided the display device that can automatically control brightness of screen depending on the ambient light.

In other words, as shown in FIG. 14b, the brightness of the organic light emitting diode (OLED) is controlled by controlling a voltage (indicated as "V" in the drawing) of the first power source VDD. For example, when ambient brightness is dark, a relatively low power voltage is supplied so as to relatively decrease the brightness of the organic light emitting diode (OLED), thereby displaying a dark screen. On the other hand, when ambient brightness is bright, a relatively high power voltage is supplied so as to relatively increase the brightness of the organic light emitting diode (OLED), thereby displaying a bright screen.

Figure 15:
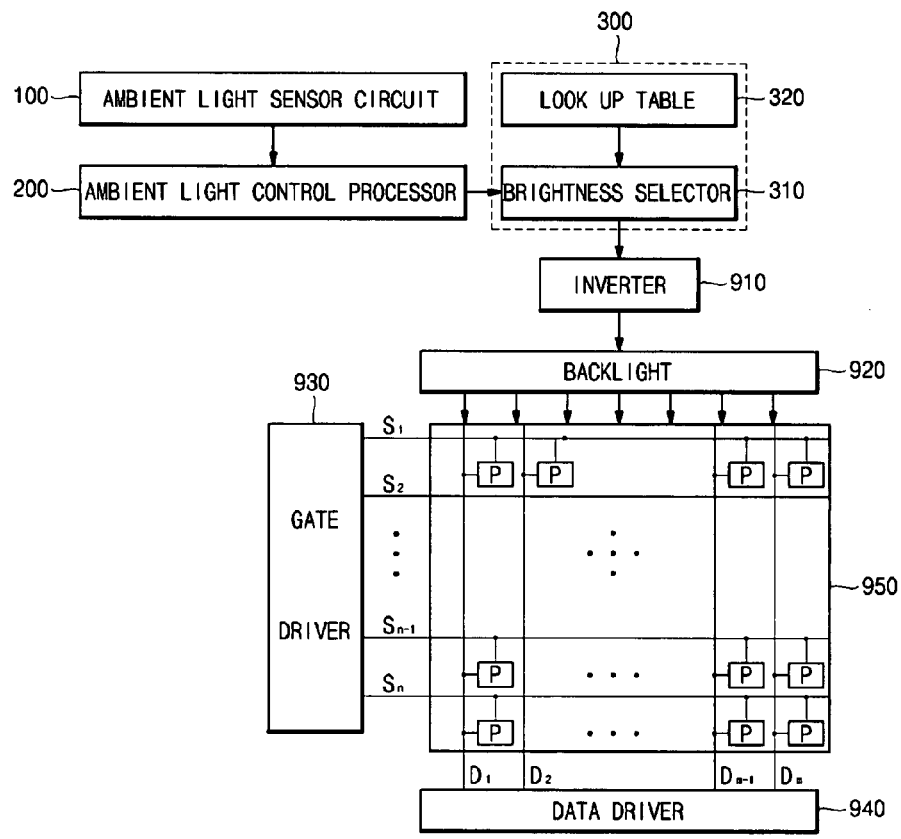
FIG. 15 is a block diagram illustrating a construction of a flat panel display device having an ambient light sensor circuit according to a further still another exemplary embodiment of the present invention.

FIG. 15 shows a block diagram illustrating a construction of a flat panel display device having an ambient light sensor circuit according to a further still another exemplary embodiment of the present invention. The ambient light sensor circuit 100 may be any one selected from the ambient light sensor circuits shown in FIGS. 1a to 1c, FIGS. 3 to 7 and FIG. 9.

Referring to FIG. 15, the flat panel display device may include the ambient light sensor circuit 100 and the ambient light control processor 200, a timing controller 300, an inverter 910, a backlight 920, a gate driver 930, a data driver 940 and a liquid crystal display panel 950. The construction and operation of the ambient light sensor circuit 100, ambient light control processor 200 and timing controller 300 have been explained in detail in the above description and thus the detailed explanation will be omitted below.

The timing controller 300 outputs a brightness control signal to the inverter 910.

Then, the inverter 910 supplies a boosted voltage corresponding to the ambient light to the backlight 920. For example, when the sensed ambient light is relatively bright, the inverter 910 supplies a relatively high boosted voltage to the backlight 920, thereby displaying a screen of high brightness through the liquid crystal display panel 950. On the other hand, when the sensed ambient light is relatively dark, the inverter 910 supplies a relatively low boosted voltage to the backlight 920, thereby displaying a screen of low brightness through the liquid crystal display panel 950.

As described above, according to the present invention, there is provided the display device that can automatically control brightness of screen depending on the ambient light.

In the liquid crystal display panel 950, a circuit unit and a color filter forms one pixel P together. The pixels are arranged in matrix type so as to display still or moving pictures. Of course, the circuit unit and color filter are operated as a kind of camera shutter, and the backlight 920 such as a cold cathode fluorescent lamp (CCFL) are disposed on the back of the liquid crystal display panel 950, thereby displaying an image of a predetermined brightness by light outputted from the backlight 920. In addition, a plurality of scan lines S1 to Sn extended from the gate driver 930 and a plurality of data lines D1 to Dm extended from the data driver 940 may be formed in the liquid crystal display panel 950.

The gate driver 930 supplies a scan signal to the liquid crystal display panel 950. The data driver 940 supplies a data voltage to the liquid crystal display panel 950. The gate driver 930 and data driver 940 are well known to those of ordinary skill in the art, and therefore detailed explanation will be omitted.

On the other hand, the ambient light sensor circuit 100 and ambient light control processor 200, timing controller 300, inverter 910, gate driver 930, data driver 940 and liquid crystal display panel 950 may be formed on one common substrate through a semiconductor process and a thin film process. Of course, at least anyone of the ambient light sensor circuit 100 and ambient light control processor 200, timing controller 300, inverter 910, gate driver 930 and data driver 940 may be formed on a substrate or chip different from the substrate where the liquid crystal display panel 950 is formed, but not limited thereto.

Figure 16:
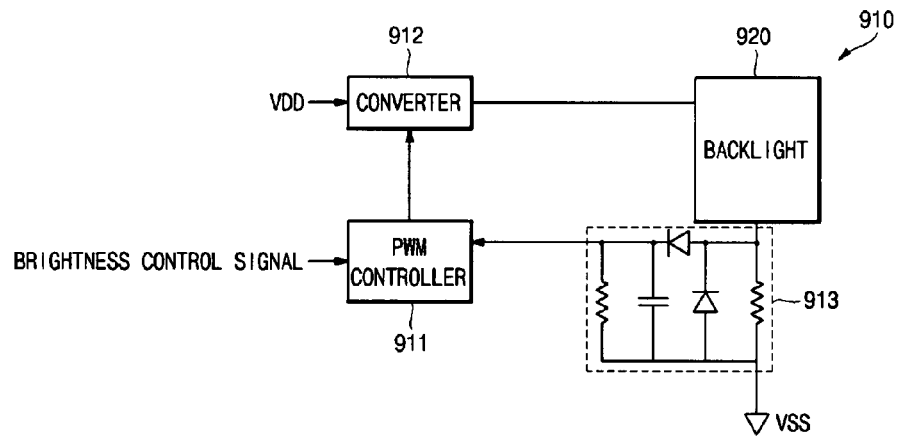
FIG. 16 is a block diagram illustrating one example of the inverter shown in FIG. 15 in detail.

FIG. 16 shows a block diagram illustrating one example of the inverter shown in FIG. 15 in detail.

Referring to FIG. 16, the inverter 910 may include a PWM controller 911 outputting a PWM control signal corresponding to a control signal related to brightness that is inputted from the timing controller 300, a converter 912 receiving an output signal of the PWM controller 911 as an input signal and boosting the power voltage VDD to a predetermined level and supplying the boosted voltage to the backlight 920, and a current sensor 913 sensing a current flowing through the backlight 920 and feedbacking the sensed current to the PWM controller 911. Of course, the construction of the inverter 910 is merely an example, but not limited thereto.

As described above, the control signal related to brightness may be inputted to the PWM controller 911 from the timing controller 300.

Then, the PWM controller 911 outputs a PWM control signal matched to the control signal to the converter. In other words, when present ambient light is dark, the PWM controller 911 outputs the PWM control signal for relatively decreasing the boosted voltage, and when the present ambient light is bright, the PWM controller 911 outputs the PWM control signal for relatively increasing the boosted voltage.

Then, after the converter 912 receives the power voltage VDD, the converter 912 boosts it to a predetermined voltage in response to the PWM control signal. Accordingly, the backlight 920 is turned on with a predetermined brightness. Here, the backlight 920 decreases brightness when the boosted voltage is low, and increases the brightness when the boosted voltage is high.

On the other hand, the current sensor 913 formed of a plurality of resistors, diodes and capacitive elements decreases the current flowing through the backlight 920 to a predetermined level and feedbacks it to the PWM controller 911. Thus, the PWM controller 911 can efficiently control the backlight 920 in accordance with a desired brightness.

As described above, according to the present invention, when the ambient light is dark, the backlight 920 is turned on in relatively dark, thereby displaying a relatively dark screen through the liquid crystal display panel 950. On the other hand, when the ambient light is bright, the backlight 920 is turned on in relatively bright, thereby displaying a relatively bright screen through the liquid crystal display panel 950. Thus, the flat panel display device can automatically control brightness of screen in correspondence to the ambient light.

As described above, the ambient light sensor circuit and a flat panel display device having the same according to the present invention produces the following effects.

First, visibility of the flat panel display device is improved in both bright place and dark place by automatically controlling screen brightness of the flat panel display device according to ambient brightness by sensing the ambient brightness and controlling an output current.

Second a lifetime of the portable flat panel display device is extended by keeping optimum power consumption by automatically controlling the power consumption according to ambient brightness Third, it is possible to prevent size and thickness of the flat panel display device from being unnecessarily increased by forming an ambient light sensor circuit, an ambient light processor, a timing controller, a data driver, a scan driver and a light control driver on the same substrate as which an organic electroluminescence panel (or liquid crystal panel) is formed on.

Fourth, the ambient light can be exactly sampled by interrupting a light leakage current applied from a light receiving element in a sampling period for the ambient light and preventing an output current from being changed by the light leakage current.

Fifth, it is possible to prevent an output current of the ambient light sensor circuit from being changed by a temperature leakage current according to increase of an ambient temperature.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. An ambient light sensor circuit, comprising:
   a transistor electrically coupled to a first power source;
   a first capacitive element electrically coupled between a control electrode of the transistor and a first reference power source;
   a second capacitive element electrically coupled between the first capacitive element and a second reference power source;
   a first light receiving element electrically coupled between the first and third reference power sources and controlling a coupling voltage of the first capacitive element and charge/discharge voltages of the second capacitive element by conducting current in response to ambient light;
   a third capacitive element electrically coupled to the second capacitive element and increasing a reverse bias capacity of the first light receiving element;
   a first switch electrically coupled to the transistor and enabling the transistor to output current from the first power source according to the coupling voltage of the first capacitive element; and
   a second switch electrically coupled between the first light receiving element and the first capacitive element and interrupting a leakage current of the first light receiving element, thereby preventing the coupling voltage of the first capacitive element from being changed.

2. The ambient light sensor circuit of claim 1, further comprising a third switch electrically coupled between the first reference power source and the second switch so as to apply a first reference voltage from the first power source to the first and second capacitive elements via the second switch.

3. The ambient light sensor circuit of claim 1, further comprising a fourth switch electrically coupled between a control electrode of the transistor and the first switch and enabling the transistor to form a diode-connected structure.

4. The ambient light sensor circuit of claim 1, further comprising a fifth switch electrically coupled between the first switch and the reference power source so as to apply a reference current to the transistor via the first switch, thereby applying a predetermined voltage to the control electrode of the transistor.

5. The ambient light sensor circuit of claim 1, further comprising a sixth switch electrically coupled to the first switch and enabling the transistor to transmit a predetermined current to an output terminal via the first switch from the first power source in response to the coupling voltage of the first and second capacitive elements.

6. The ambient light sensor circuit of claim 1, further comprising a seventh switch electrically coupled between the second and third capacitive elements so as to electrically couple them each other.

7. The ambient light sensor circuit of claim 1, further comprising:
   a third switch electrically coupled between the first reference power source and the second switch so as to apply a first reference voltage from the first power source to the first and second capacitive elements via the second switch;
   a fourth switch electrically coupled between a control electrode of the transistor and the first switch and enabling the transistor to form a diode-connected structure;
   a fifth switch electrically coupled between the first switch and the reference power source so as to apply a reference current to the transistor via the first switch, thereby applying a predetermined voltage to the control electrode of the transistor;
   a sixth switch electrically coupled to the first switch and enabling the transistor to transmit a predetermined current to an output terminal via the first switch from the first power source in response to the coupling voltage of the first and second capacitive elements;
   and
   a seventh switch electrically coupled between the second and third capacitive elements so as to electrically couple them each other.

8. The ambient light sensor circuit of claim 7, wherein the first light receiving element is any one selected from a p-intrinsic-n (p-i-n) diode, a p-intrinsic-metal (p-i-m) diode, a p-n diode and a photocoupler, whose anode is electrically coupled to the first reference power source and the cathode is electrically coupled to the third reference power source.

9. The ambient light sensor circuit of claim 8, wherein the third reference voltage applied from the third reference power source is higher than the first reference voltage applied from the first reference power source.

10. The ambient light sensor circuit of claim 7, wherein the first light receiving element is any one selected from a p-intrinsic-n (p-i-n) diode, a p-intrinsic-metal (p-i-m) diode, a p-n diode and a photocoupler, whose cathode is electrically coupled to the first reference power source and the anode is electrically coupled to the third reference power source.

11. The ambient light sensor circuit of claim 10, wherein the third reference voltage applied from the third reference power source is lower than the first reference voltage applied from the first reference power source.

12. The ambient light sensor circuit of claim 7, further comprising a second light receiving element electrically coupled between the first light receiving element and a fourth reference power source and including a light shielding layer, and accordingly sensing only a leakage current depending on an increase of temperature because ambient light is shielded.

13. The ambient light sensor circuit of claim 7, further comprising:
   a temperature sensor sensing a temperature;
   a look up table electrically coupled to the temperature sensor and storing an ambient light sensing time corresponding to the sensed temperature; and
   a controller electrically coupled to the look up table and supplying a first control signal, a second control signal, a third control signal, a fourth control signal, a fifth control signal and a sixth control signal respectively to the first switch, the second and third switch, the fourth switch, the fifth switch, the sixth switch and the seventh switch in response to the ambient light sensing time outputted from the look up table.

14. The ambient light sensor circuit of claim 7, further comprising:
   a first switching transistor whose first and second electrodes are electrically coupled between the first and second capacitive elements and the control electrode is electrically coupled to a second negative control signal; and
   a second switching transistor whose first and second electrodes are electrically coupled to the transistor and the control electrode is electrically coupled to a third negative control signal.

15. The ambient light sensor circuit of claim 7, wherein the fourth and seventh switches are formed of two serially connected transistors.

16. The ambient light sensor circuit of claim 1, further comprising a second light receiving element electrically coupled between the first light receiving element and a fourth reference power source and including a light shielding layer, and accordingly sensing only a leakage current depending on an increase of temperature because ambient light is shielded.

17. The ambient light sensor circuit of claim 1, further comprising:
   a temperature sensor sensing a temperature;
   a look up table electrically coupled to the temperature sensor and storing an ambient tight sensing time corresponding to the sensed temperature; and
   a controller electrically coupled to the look up table and supplying a first control signal to the first switch in response to the ambient light sensing time outputted from the look up table.

18. The ambient light sensor circuit of claim 1, further comprising:
   a first switching transistor whose first and second electrodes are electrically coupled between the first and second capacitive elements and the control electrode is electrically coupled to a second negative control signal; and
   a second switching transistor whose first and second electrodes are electrically coupled to the transistor and the control electrode is electrically coupled to a third negative control signal.

19. A flat panel display device, comprising:
an ambient light sensor circuit which includes: a transistor electrically coupled to a first power source; a first capacitive element electrically coupled between the transistor and a first reference power source; a second capacitive element electrically coupled between the first power source, the first capacitive element and a second reference power source; a first light receiving element electrically coupled between the first and third reference power sources and controlling a coupling voltage of the first capacitive element and charge/discharge voltages of the second capacitive element by conducting current in response to ambient light; a third capacitive element electrically coupled to the second capacitive element and increasing a reverse bias capacity of the first light receiving element; a first switch electrically coupled to the transistor and enabling the transistor to output current from the first power source according to the coupling voltage of the first capacitive element; and a second switch electrically coupled between the first light receiving element and the first capacitive element and interrupting a leakage current of the first light receiving element, thereby preventing the coupling voltage of the first capacitive element from being changed;
an ambient light control processor receiving an analog output signal from the ambient light sensor circuit as an input signal and calculating a present ambient light and outputting it as a digital value;
a timing controller receiving the output signal from the ambient light control processor as an input signal and outputting a control signal corresponding to the present ambient light; and
an organic electroluminescence panel receiving the control signal corresponding to the present ambient light applied from the timing controller and light-emitting with a brightness corresponding to the present ambient light.

20. The flat panel display device of claim 19, wherein the timing controller comprises:
a look up table storing data corresponding to the present ambient brightness; and
a brightness selector comparing a data inputted from the ambient light control processor with a data stored in the look up table and selecting a data control signal corresponding to the present ambient brightness and outputting it to the data driver.

21. The flat panel display device of claim 19, further comprising a data driver receiving the output signal from the timing controller as an input signal and outputting a data signal corresponding to the present ambient brightness and applying it to the organic electroluminescence panel.

22. The flat panel display device of claim 19, further comprising a light emitting control driver receiving the output signal from the timing controller as an input signal and outputting a light emitting control signal and applying it to the organic electroluminescence panel.

23. The flat panel display device of claim 19, further comprising a power controller receiving the output signal from the timing controller as an input signal and outputting a power voltage corresponding to the present ambient light and applying it to the organic electroluminescence panel.

24. A flat panel display device, comprising:
an ambient light sensor circuit which includes: a transistor electrically coupled to a first power source; a first capacitive element electrically coupled between the transistor and a first reference power source; a second capacitive element electrically coupled between the first power source, the first capacitive element and a second reference power source; a first light receiving element electrically coupled between the first and third reference power sources and controlling a coupling voltage of the first capacitive element and charge/discharge voltages of the second capacitive element by conducting current in response to ambient light; a third capacitive element electrically coupled to the second capacitive element and increasing a reverse bias capacity of the first light receiving element; a first switch electrically coupled to the transistor and enabling the transistor to output current from the first power source according to the coupling voltage of the first capacitive element; and a second switch electrically coupled between the first light receiving element and the first capacitive element and interrupting a leakage current of the first light receiving element, thereby preventing the coupling voltage of the first capacitive element from being changed;
an ambient light control processor receiving an analog output signal from the ambient light sensor circuit as an input signal and calculating a present ambient light and outputting it as a digital value;
a timing controller receiving the output signal from the ambient light control processor as an input signal and outputting a control signal corresponding to the present ambient light;
an inverter receiving the output signal from the timing controller as an input signal and boosting the power voltage to a level corresponding to the present ambient light and outputting it;
a backlight turned on/off by a voltage supplied from the inverter; and
a liquid crystal display panel displaying a screen by the backlight.

* * * * *